United States Patent
Onishi et al.

(10) Patent No.: US 7,360,906 B2
(45) Date of Patent: Apr. 22, 2008

(54) PROJECTION OPTICAL SYSTEM UNIT AND PROJECTION-TYPE IMAGE DISPLAY APPARATUS USING THE SAME

(75) Inventors: Satoshi Onishi, Amagasaki (JP); Atsushi Matsuura, Sakai (JP); Kohei Wataru, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 378 days.

(21) Appl. No.: 11/244,546

(22) Filed: Oct. 6, 2005

(65) Prior Publication Data

US 2006/0262284 A1 Nov. 23, 2006

(30) Foreign Application Priority Data

May 17, 2005 (JP) ............................. 2005-143827

(51) Int. Cl.
*G03B 21/14* (2006.01)
*G03B 21/22* (2006.01)
*G03B 21/28* (2006.01)
*G03B 21/18* (2006.01)
*G03B 21/26* (2006.01)
*G03B 21/56* (2006.01)
*G02B 27/14* (2006.01)
*G02B 5/10* (2006.01)

(52) U.S. Cl. ................. 353/119; 353/122; 353/78; 353/57; 353/37; 359/449; 359/460; 359/634; 359/858; 359/859; 359/864

(58) Field of Classification Search ............... 353/119, 353/122, 99, 98, 74, 77–78, 52, 57–58, 37; 359/449, 460, 439, 634, 838, 850, 858–859, 359/864

See application file for complete search history.

(56) References Cited

U.S. PATENT DOCUMENTS

| | | | |
|---|---|---|---|
| 6,527,397 B2 | 3/2003 | Furuichi et al. | 353/119 |
| 6,626,541 B2 | 9/2003 | Sunaga | 353/69 |
| 6,752,500 B1 | 6/2004 | Yoshii et al. | 353/78 |
| 6,779,894 B2 | 8/2004 | Shiraishi et al. | 353/57 |
| 6,805,447 B2 | 10/2004 | Takeuchi | 353/71 |
| 2002/0126263 A1 | 9/2002 | Konishi | 353/31 |

FOREIGN PATENT DOCUMENTS

| | | |
|---|---|---|
| JP | 2003-215714 A | 7/2003 |
| JP | 2004-53658 A | 2/2004 |
| JP | 2004-145264 A | 5/2004 |

*Primary Examiner*—Diane I. Lee
*Assistant Examiner*—Magda Cruz
(74) *Attorney, Agent, or Firm*—Sidley Austin LLP

(57) ABSTRACT

A projection optical system unit has a lower pedestal. The lower pedestal has first and second tubular portions opened to each other. An image formation device holding plate for a DMD is mounted on the first tubular portion at a side where one opening is formed. A mirror holder for a convex mirror is fixed on the second tubular portion at a side where the other opening is formed. A linear heat expansion coefficient in a specific direction of the lower pedestal component is set between $0.8 \times 10^{-5}$ (1/K) and $3.0 \times 10^{-5}$ (1/K).

28 Claims, 22 Drawing Sheets

PROJECTION OPTICAL SYSTEM UNIT AND PROJECTION-TYPE IMAGE DISPLAY APPARATUS USING THE SAME

RELATED APPLICATION

This application is based on Japanese Patent Application No. 2005-143827, the contents in which are incorporated herein by reference.

BACKGROUND OF THE INVENTION

The present invention relates to a projection optical unit and a projection-type image display apparatus using such the unit. In particular, the present invention relates to a rear projection television, video projector, or other projection-type image display apparatuses having a reflection-type image formation device such as a DMD (Digital Micromirror Device) or the like, or a transmission-type image formation device such as a transmission-type liquid crystal device or the like.

Projection optical systems which enlarge and project images formed by an image formation device in a projection-type image display apparatus can be broadly divided into refraction optical systems, mainly comprising lenses and other refractive optical elements, and reflection optical systems, mainly comprising mirrors and other reflective optical elements. In general, since the reflection optical system has no chromatic aberration, it has advantage that finer images can be obtained. In addition, positional relationships between the image formation device and mirrors and positional relationships between the mirrors in the reflection optical system have a much greater effect on optical performances, compared with positional relationships between the image formation device and lenses and positional relationships between lenses in the refraction optical system. In other words, a reflection optical system is sensitive to the positional relationships between the image formation device and the mirrors and to the positional relationships between mirrors.

Japanese Patent Laid-open Publication No. 2004-53658 discloses a projection-type image display apparatus which adopts a reflection optical system as the projection optical system. However, in this projection-type image display apparatus, an image formation device and mirrors which constitute the projection optical system are supported by support structures separated from each other. Consequently it is difficult to maintain the image formation device and the mirrors appropriately in a positional relationship according to an optical design. Specifically, it is difficult to appropriately set and to maintain inclinations and distances of the mirrors with respect to the image formation device. In particular, when a shock acts on the apparatus, shifting tends to occur in the inclinations and distances of the mirrors with respect to the image formation device. Moreover, shifts in the inclinations and distances of the mirrors with respect to the image formation device readily occur due to thermal expansion resulting from temperature changes. Deteriorated optical performance of the projection optical system due to the shifts in inclinations or distances of the mirrors with respect to the image formation device degrades quality of displayed images. Thus, the projection-type image display apparatus in which separate support structures support the image formation device and mirrors lacks reliability with respect to shocks and changes in temperature.

SUMMARY OF THE INVENTION

An object of this invention is to enable appropriate setting and maintenance of an inclination and distance of a mirror with respect to an image formation device in a projection optical system having a reflection optical system, so as to enhance reliability.

The present invention provides a projection optical system unit comprising, a plurality of curved mirrors for reflecting image light modulated by an image formation device onto a screen, an image formation device holder for holding the image formation device, a plurality of mirror holders each of which holds one of the curved mirrors, and a pedestal to which the image formation device holder and at least one of the mirror holders are fixed. It is preferable that a linear heat expansion coefficient of which in a specific direction is between $0.8 \times 10^{-5}$ (1/K) and $3.0 \times 10^{-5}$ (1/K). The specific direction is defined as a direction intermediate between directions of a incident light beam and emitted light beam of one of the curved mirrors.

Preferably, the image formation device and a first curved mirror positioned closest to the image formation device in at light path from the image formation device to the screen among the plurality of curved mirrors are held by the common pedestal.

A positional relationship between the image formation device and first curved mirror greatly affects an optical performance of a projection optical system. By fixing the image formation device holder which holds the image formation device and the first mirror holder which holds the first curved mirror to the common pedestal, the inclination and distance of the first curved mirror with respect to the image formation device can be appropriately set and maintained, thereby achieving an adequate optical performance corresponding to an optical design of the projection optical system. In particular, shifts in the inclination and distance of the first curved mirror with respect to the image formation device, arising from shocks and from thermal expansion due to temperature changes, can be prevented or alleviated, so that high reliability is attained.

BRIEF DESCRIPTION OF THE DRAWINGS

These and other objects and features of the invention will become apparent from the following description taken in conjunction with preferred embodiments of the invention with reference to the accompanying drawings, in which.

DETAILED DESCRIPTION OF THE PREFERRED EMBODIMENTS

First Embodiment

Figure 1:
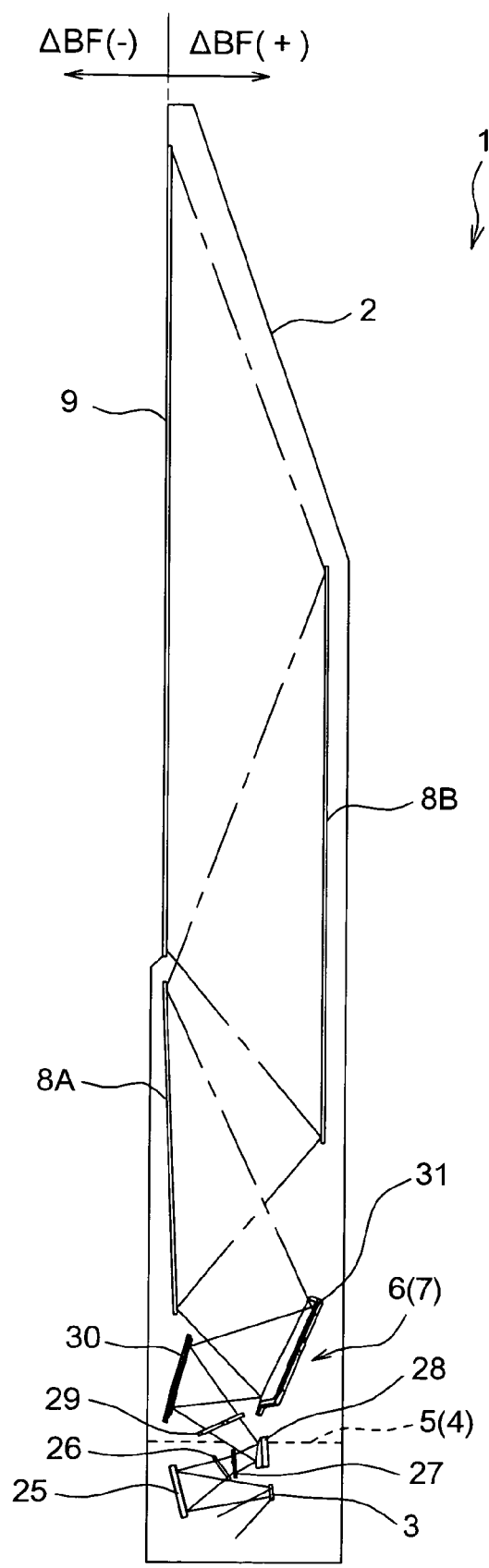
FIG. 1 is a schematic diagram showing a rear projection television of a first embodiment of the present invention.

FIG. 1 shows a rear projection television (rear projection TV) 1 which is an embodiment of a projection-type image display apparatus of the present invention. Accommodated within the casing 2 of the rear projection TV 1 are a digital micromirror device (DMD) 3 which is one example of a reflection-type image formation device, an illumination optical system unit 5 having an illumination optical system 4 which irradiates the DMD 3 with illumination light, and a projection optical system unit 7 having a projection optical system 6 which enlarges and projects projection light reflected by the DMD 3, i.e., image light. Arranged on an upper front of the casing 2 is positioned a screen 9, onto which the image enlarged by the projection optical system 6 is projected through two planar mirrors 8A and 8B.

Figure 2:
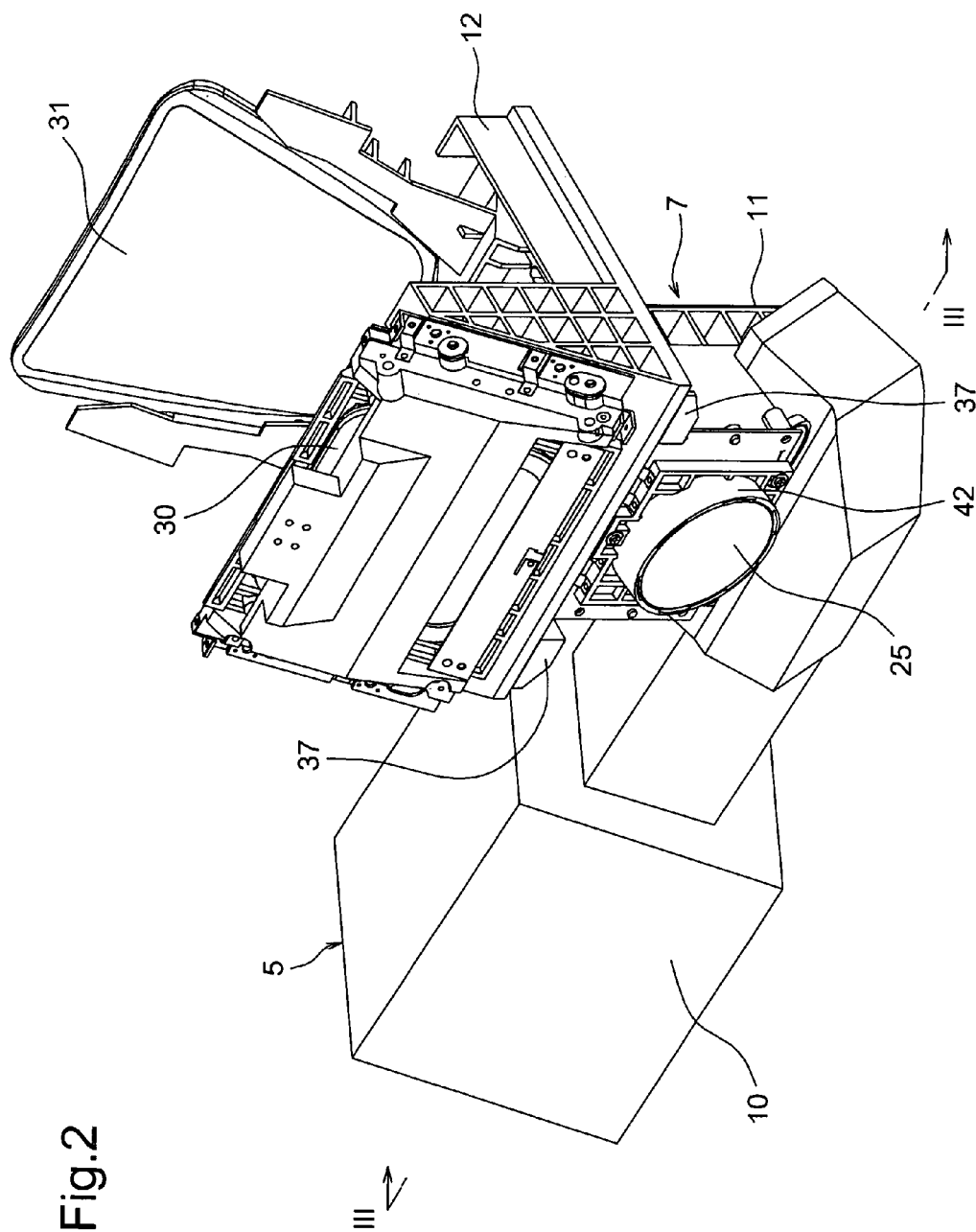
FIG. 2 is an external perspective view of an illumination optical system unit and a projection optical system unit.
Figure 4:
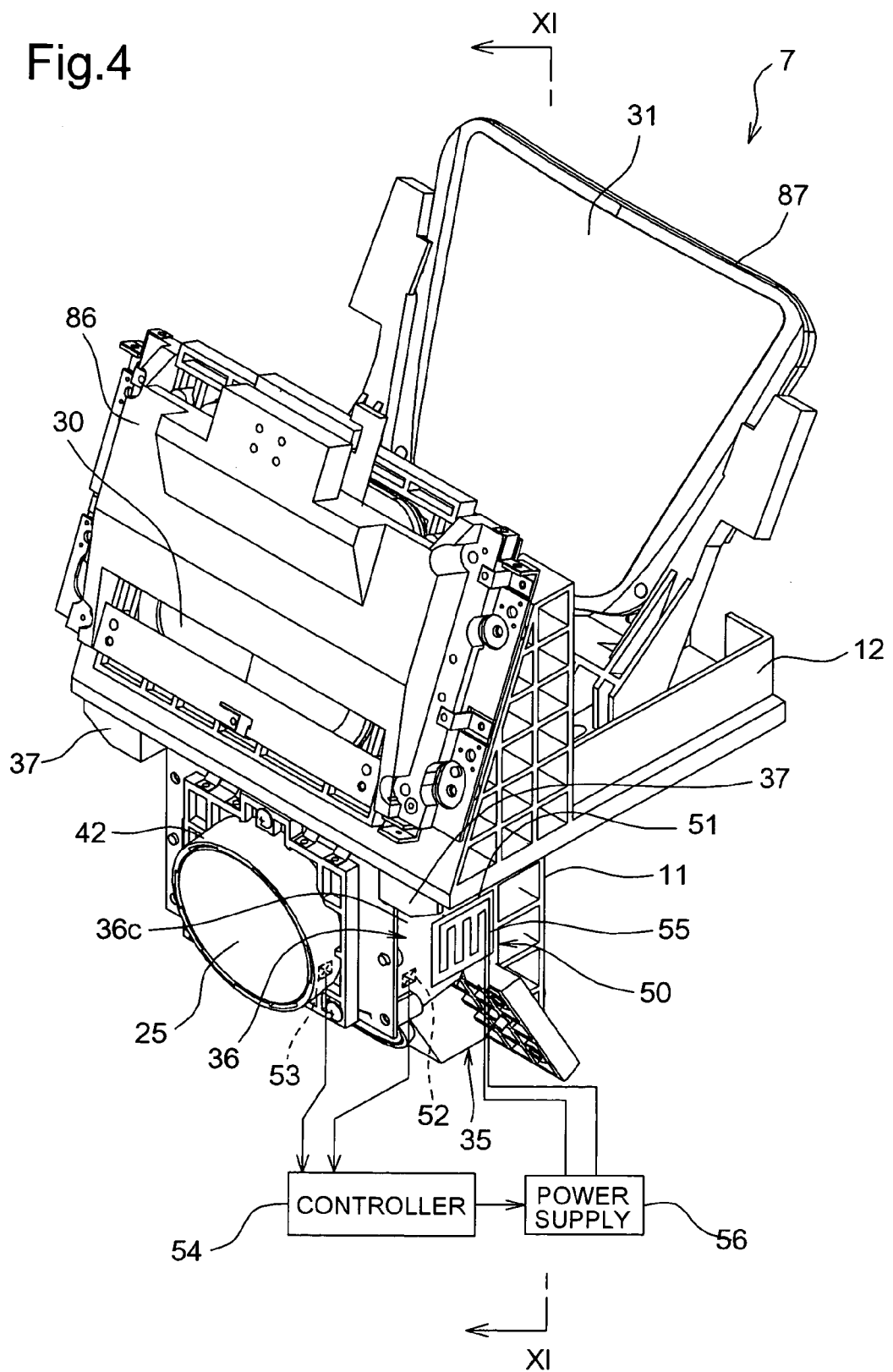
FIG. 4 is an external front perspective view of the projection optical system unit.
Figure 5:
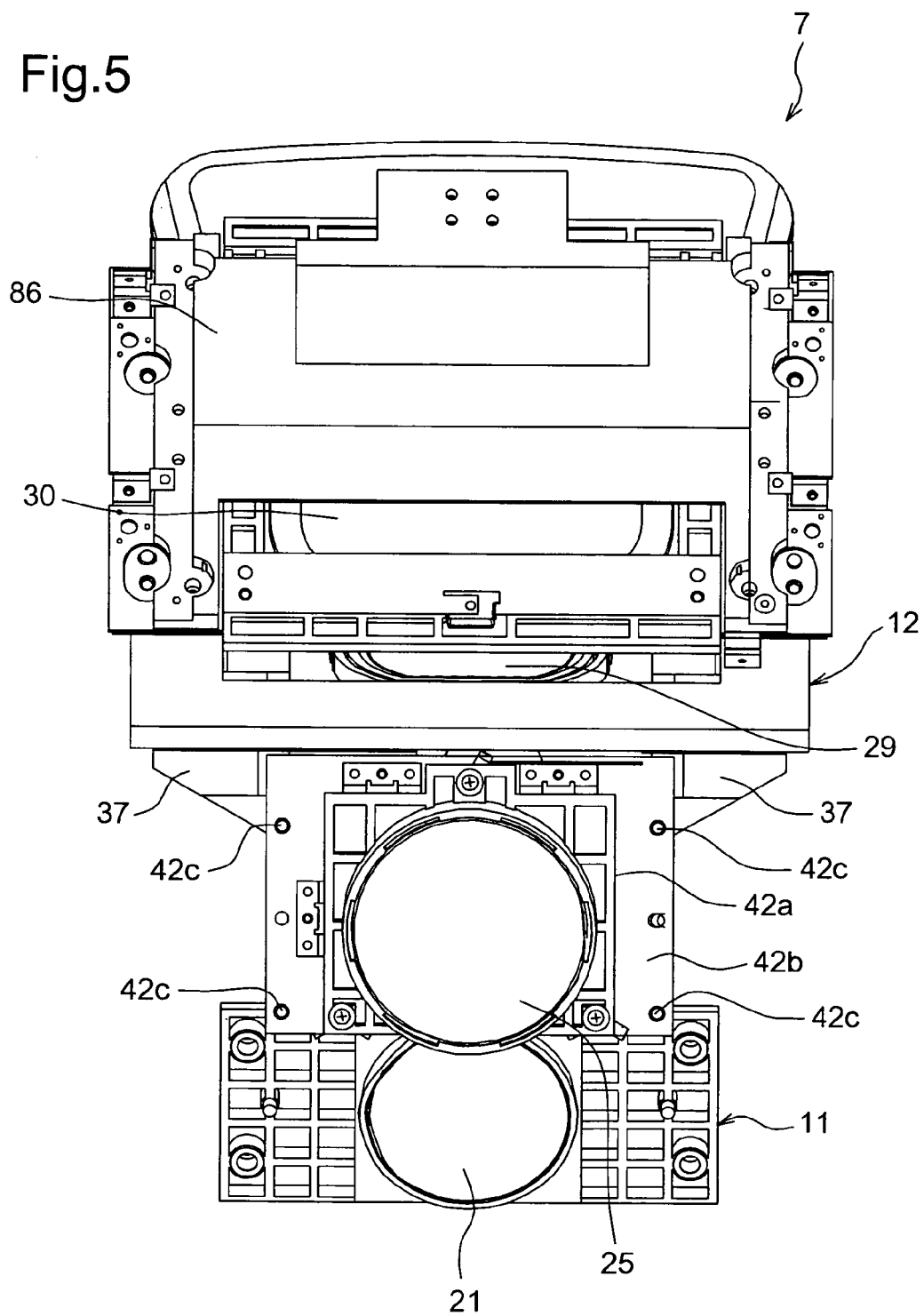
FIG. 5 is a front side view of the projection optical system unit.
Figure 6:
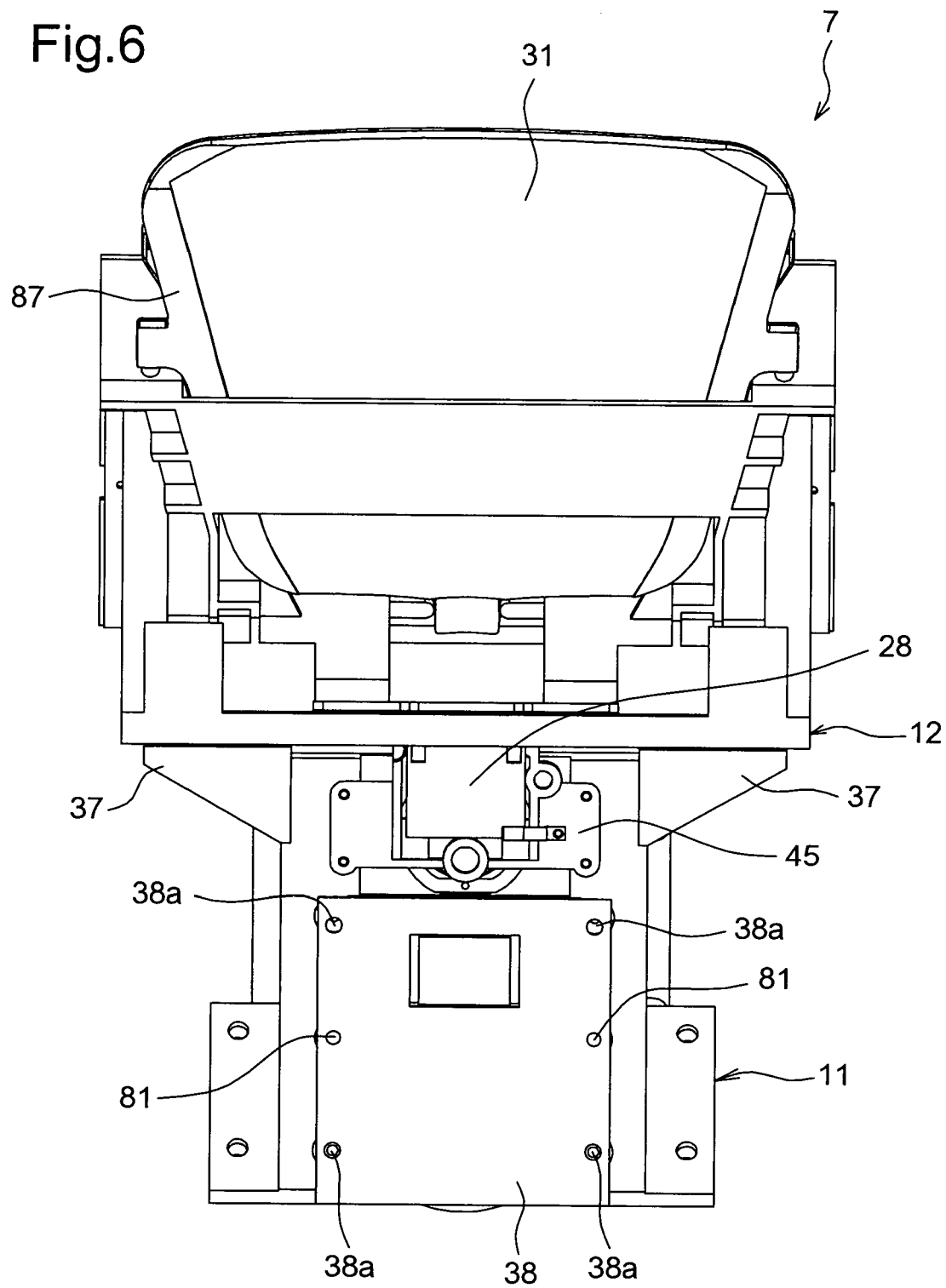
FIG. 6 is a rear side view of the projection optical system unit.

Further referring to FIG. 2, in addition to a housing 10 of the illumination optical system unit 5, the casing 2, at a bottom portion, accommodates a lower pedestal component (first pedestal portion) 11 and an upper pedestal component (second pedestal portion) 12 of the projection optical system unit 7. Within the housing 10, optical devices of the illumination optical system 4 are held. The DMD 3 and the optical components of the projection optical system 6 are held by the lower and upper pedestal portions 11, 12. Referring to FIG. 4 through FIG. 6, the lower pedestal component 11 has a pair of platforms 37 at upper portion. The upper pedestal portion 12 is placed on these platforms 37. The lower pedestal component 11 and upper pedestal portion 12 consist of, for example, polycarbonate or a similar material, and, as explained in detail below, has a linear thermal expansion coefficient al in a specific direction set between $0.8 \times 10^{-5}$ (1/K) and $3.0 \times 10^{-5}$ (1/K). The projection optical system unit 7 has a heating device 50 for the lower pedestal component 11 described in detail below.

The DMD 3 comprises numerous minute mirror elements arranged in two dimensions to form a mirror surface. A reflection angle of each mirror elements can be switched between two directions independently. Each mirror element corresponds to one pixel of the image projected onto the screen 9. Mirror elements the reflection angle of which is set in one of the two directions are in an "on" status. Illumination 25 fluxes from the illumination optical system 4 reflected by these on-status mirror elements (image light) is projected onto the screen 9 through the projection optical system 6 and the planar mirrors 8A, 8B. On the other hand, mirror elements the reflection angle of which is set in the other of the two directions are in the "off" status. The Luminous fluxes from the illumination optical system 4 reflected by these off-status mirror elements are not incident on the projection optical system 6, resulting in that the corresponding pixels on the screen 9 are displayed as black pixels.

Figure 3:
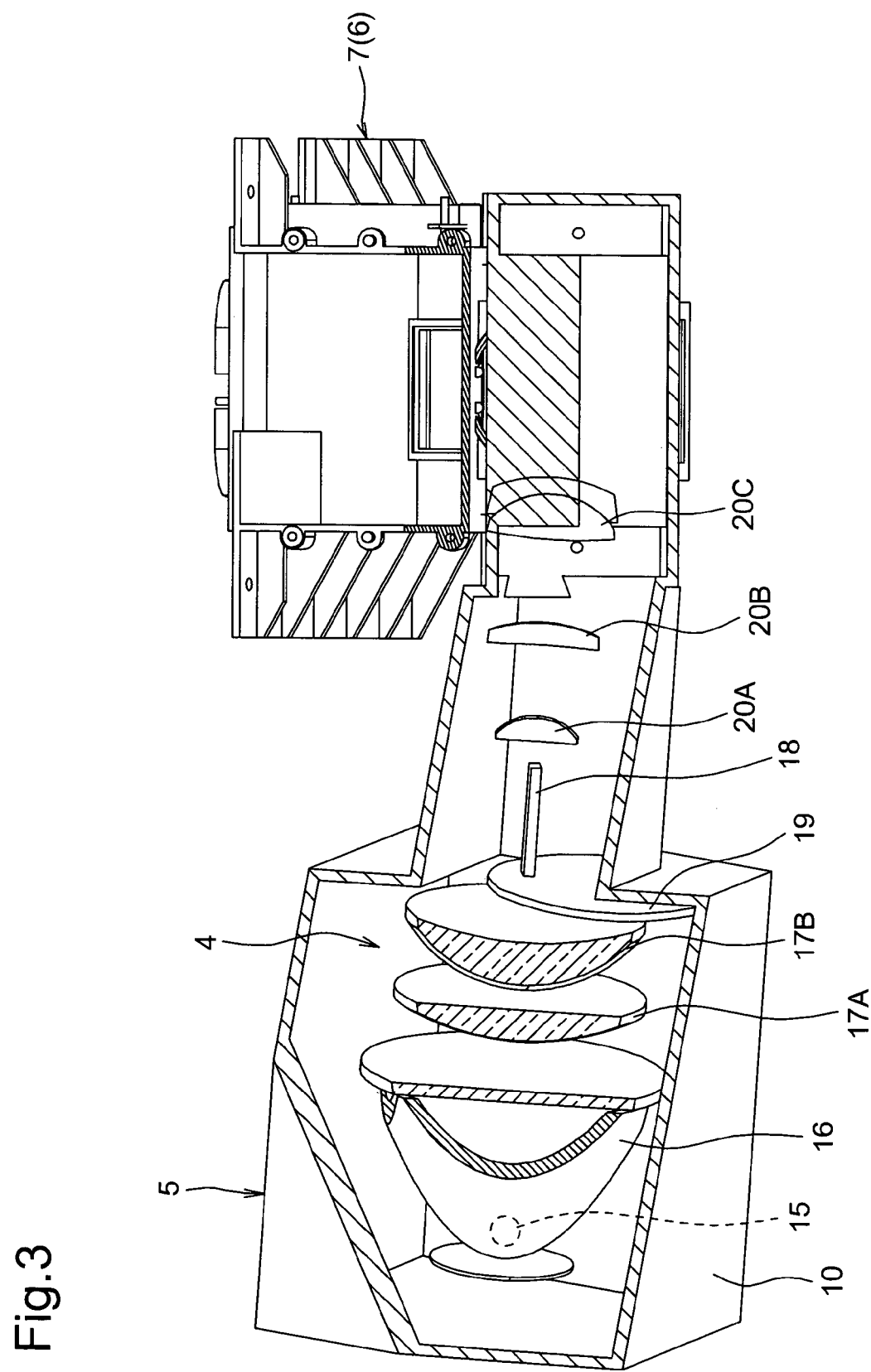
FIG. 3 is a cross sectional view along a line III-III in FIG. 2.

Referring to FIG. 3, the illumination optical system 4 is provided so as to be directed substantially perpendicular to the projection optical system 6. The illumination optical system 4 has, for example, a discharge lamp 15 which is an ultra-high pressure mercury lamp, a parabolic mirror 16, condenser lenses 17A, 17B, a color wheel 19, an integrator rod 18, relay lenses 20A, 20B, and 20C, and an aperture and mirrors not shown. Further, the illumination optical system 4 has an entrance lens 21 shown in FIGS. 5 and 11.

Light emitted from the discharge lamp 15 is converted into parallel rays by the parabolic mirror 16, and is focused on an incidence surface of the integrator rod 18 by the condenser lenses 17A and 17B. Color filters each of which passes red, blue, and green lights respectively are provided on a circumference of the color wheel 19 positioned in proximity to the incidence surface of the integrator rod 18. By rotating the color wheel 19, the light incident on the integrator rod 18 is allocated among different colors by time division. The integrator rod 18 is a rectangular parallelepiped glass rod. The light incident on an internal surface of the integrator rod 18 undergoes total reflection and superpositioning, so that an luminous flux having uniform intensity distribution is emitted from an emission surface. The integrator rod 18 may also be a hollow rod having reflective internal surfaces. The relay lenses 20A to 20C, aperture diaphragm not shown, mirrors not shown, and entrance lens 21 of FIGS. 5 and 11, cause the image of the emission surface of the integrator rod 18 to be formed on the DMD 3. This achieves that the DMD 3 is illuminated with light of uniform intensity.

Figure 11:
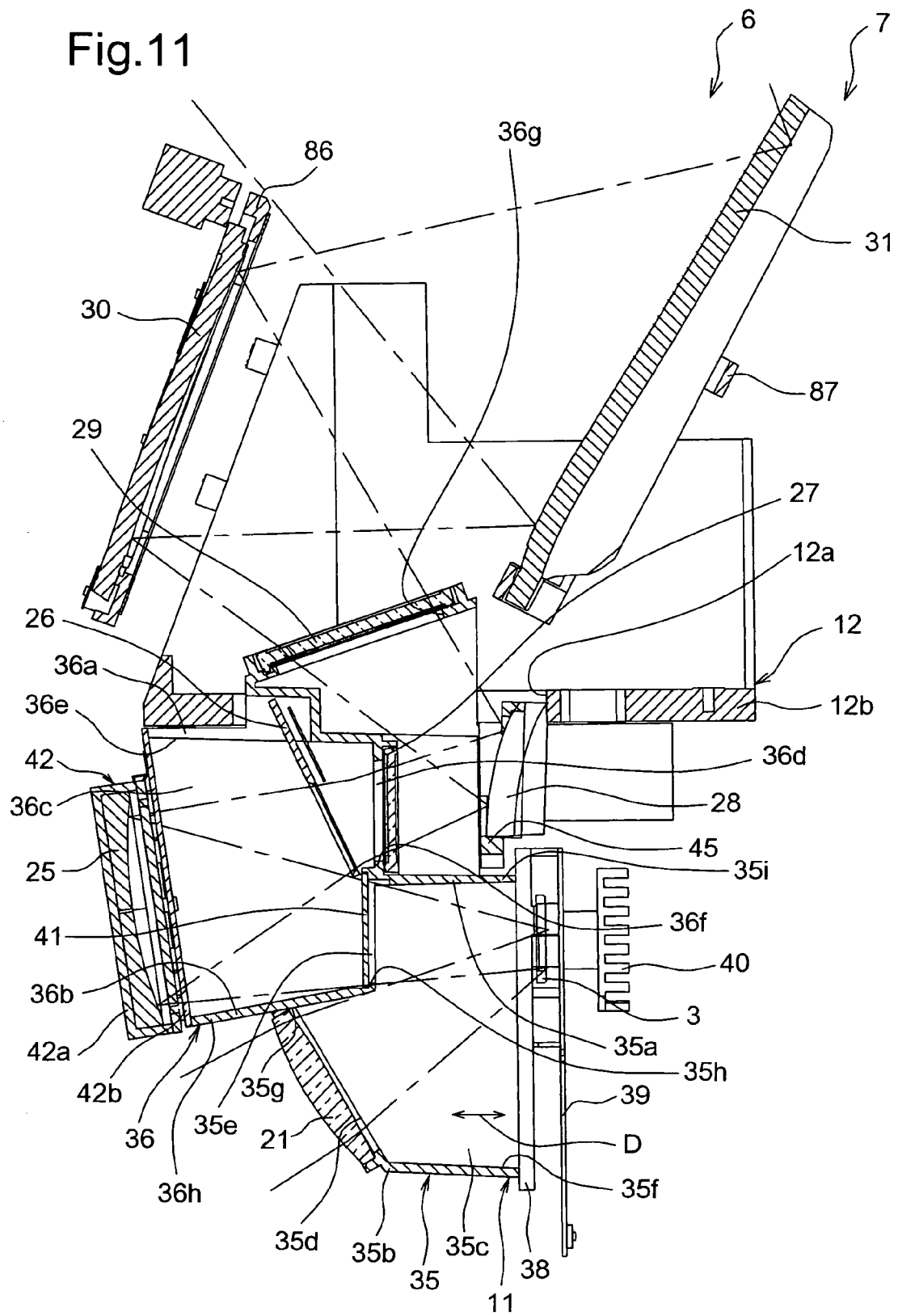
FIG. 11 is a cross sectional view along a line XI-XI in FIG. 4.

Referring to FIGS. 1 and 11, the projection optical system 6 has four curved mirrors 25, 28, 30, and 31, two aberration correction plates 27, 29; and one variable aperture diaphragm mechanism 26. In detail, a concave mirror (first curved mirror) 25, the aperture variable diaphragm mechanism 26, a first aberration correction plate 27, a convex mirror (second curved mirror) 28, a second aberration correction plate 29, a first free-form curved mirror (third curved mirror) 30; and a second free-form curved mirror (fourth curved mirror) 31 is disposed in a light path from the DMD 3 to the screen 9. The image light from the DMD 3 is guided to the screen 9 in this order. The concave mirror 25 is a spherical surface mirror, whereas the convex mirror 28 is an axially symmetric aspherical surface mirror. Since the concave mirror 25 and convex mirror 28 reflect the image light with a relatively small luminous flux diameter, they are made of thermal inhibiting glass material. Each of the first and second free-form curved mirrors 30 and 31 has a non-rotationally symmetric reflection surface. The first free-form curved mirror 30 is a concave mirror, whereas the second free-form curved mirror 31 is a convex mirror. The first and second aberration correction plates 27, 29 have almost no optical power. The first and second free-form curved mirrors 30, 31 and the first and second aberration correction plates 27, 29 are made of resin material. Of these optical components constituting the projection optical system 6, the concave mirror 25, variable diaphragm mechanism 26, first aberration correction plate 27, convex mirror 28, and second aberration correction plate 29 are held by the lower pedestal component 11, while the first and second free-form curved mirrors 30, 31 are held by the upper pedestal portion 12.

The positional relationship between the DMD 3 and concave mirror 25 has a significant influence on an optical performance of the projection optical system 6. As explained below, by fixing an image formation device holding plate 38 which holds the DMD 3 and a mirror holding component 42 which holds the concave mirror 25 to the lower pedestal component 11 in common, an inclination and a distance of the concave mirror 25 with respect to the DMD 3 can be appropriately set and maintained, resulting in that the projection optical system 6 achieves the optical performance according to the optical design. In particular, shifts in the inclination and distance of the concave mirror 25 with respect to the DMD 3 arising from shocks and thermal expansion due to temperature changes can be prevented or alleviated, resulting in improved reliability.

Similarly to the positional relationship between the DMD 3 and concave mirror 25, a positional relationship between the concave mirror 25 and convex mirror 28 also has a significant influence on the optical performance of the projection optical system 6.

As explained below, by fixing the mirror holding portion 45 which holds the convex mirror 28 to the lower pedestal component 11, in common with the DMD 3 and concave mirror 25, the inclination and distance of the convex mirror 28 with respect to the concave mirror 25 can be set and maintained appropriately. In particular, shifts in the inclination and distance of the convex mirror 28 with respect to the concave mirror 25 arising from shocks and thermal expansion due to temperature changes can be prevented or alleviated.

Next, with reference to FIGS. 4 to 12 the lower pedestal component 11 and the optical components held thereby are explained in detail. The lower pedestal component 11 is a single member, and comprises a first tubular portion 35 and second tubular portion 36 both of which extends generally in a horizontal direction. The second tubular portion 36 is formed so as to be continuous with the first tubular portion 35, and is positioned upper left side in FIG. 11 with respect to the first tubular portion 35.

As shown in FIG. 11, the first tubular portion 35 comprises a top wall 35a, bottom wall 35b, a pair of side walls 35c opposite to each other, a lower end wall 35d which closes the lower portion of one end (on the left side in FIG. 11), and an upper end wall 35e which closes the upper portion of one end. Further, an opening (first opening) 35f is formed at the other end (on the right side in FIG. 11) of the first tubular portion 35.

On the other hand, the second tubular portion 36 comprises a top wall 36a, bottom wall 36b, a pair of side walls 36c opposite to each other, and an end wall 36d which closes the upper portion of one end (on the right side in FIG. 11). Further, an opening (second opening) 36e is formed at the other end (on the left side in FIG. 11) of the second tubular portion 26. The platforms 37 described above are provided on an upper outside of the second tubular portion 36. The bottom wall 36b of the second tubular portion 36 protrudes slightly into the first tubular portion 35, and therebelow the lower end wall 35d of the first tubular portion 35 is arranged, while thereabove the upper end wall 35e of the first tubular portion 35 is arranged. On the other hand, the upper end wall 35e of the first tubular portion 35 reaches the end wall 36d of the second tubular portion 36.

The opening 35f of the first tubular portion 35 on the right side in FIG. 11 is closed in the sealed status by the image formation device holding plate (image formation device holder) 38 for holding the DMD 3. The rear side of the DMD 3 is mounted on the base 39. Further, a heat sink (heat dissipation member) 40 is connected to the DMD 3.

Figure 12:
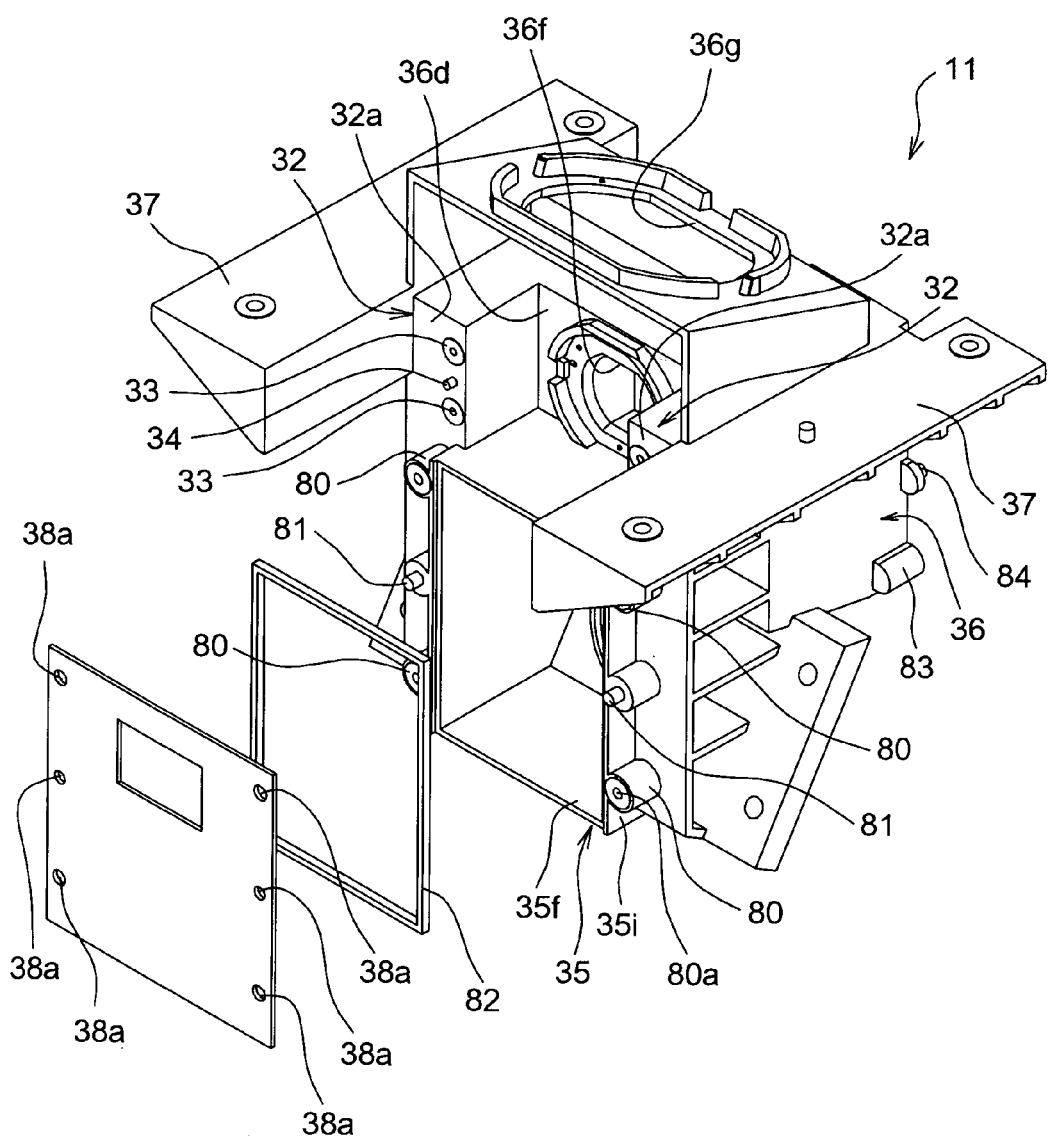
FIG. 12 is an exploded perspective view of the lower side pedestal portion.

The mounting structure of the image formation device holding plate 38 to the first tubular portion 35 is explained with reference to FIGS. 6 and 12. There are two screw portions each on the right and left sides of the edge (first edge) 35i surrounding the opening 35f of the first tubular portion 35 for a total of four screw portions 80, as well as one positioning protrusion each on the right and left of the edge 35i for a total of two positioning protrusions 81. The screw portions 80 are provided at positions corresponding to four corners of the opening 35f. Further, a female screw 80a is provided in each of the screw portions 80. Six through holes 38a are formed in the image formation device holding plate 38 at positions corresponding to the positioning protrusions 81 and the female screws 80a of the screw portions 80. The positioning protrusions 81 are inserted into the through holes 38a, and moreover male screws passing through the through holes 38a are screwed into the female screws 80a of the screw portions 80 to fix the image formation device holding plate 38 to the first tubular portion 35. The vicinities of the four corners of the image formation device holding plate 38 abut the tips of the four screws 80, and as a result the image formation device holding plate 38 is held at predetermined position and posture with respect to the first tubular portion 35. Moreover, an elastic member 82 with a strip-frame shape is disposed in a compressed status between the image formation device holding plate 38 and the edge 35i surrounding the opening 35f. The image formation device holding plate 38 is in close contact with the edge 35i via the elastic member 82.

By causing the image formation device holding plate 38 to be in close contact with the edge 35i of the first tubular portion 35, the image formation device holding plate 38 can be fixed to the lower pedestal component 11 in a status in which the inclination and position of the DMD 3 are precisely determined. Further, the strength of installation of the image formation device holding plate 38 onto the lower pedestal component 11 is increased, resulting in that shifts in inclination or position of the DMD 3 due to shocks can be prevented or alleviated. Moreover, by mounting the image formation device holding plate 38 on the edge 35i surrounding the opening 35f, the rigidity of the lower pedestal component 11 is enhanced, resulting in that deformation of the lower pedestal component 11 due to shocks can be prevented or alleviated.

An opening 35g is also formed in the lower end wall 35d of the first tubular portion 35 provided in the lower left portion of the lower pedestal component 11 in FIG. 11. An entrance lens 21 of the illumination optical system 4 is mounted on this opening 35g.

An opening (third opening) 35h opened to the interior of the first tubular portion 35 and to the interior of the second tubular portion 36 is formed in the upper end wall 35e of the first tubular portion 35 positioned on the right side in FIG. 11. The optical path from the DMD 3 to the concave mirror 25 which is the initial optical component of the projection optical system 6 passes through this opening 35h. This opening 35h is closed by dust-proof cover glass 41.

The concave mirror 25 is mounted on the opening 36e of the second tubular portion 36. Specifically, the concave mirror 25 is fixed in place by a mirror holding component (first mirror holder) 42, and the opening 36e is closed in a sealed status by the mirror holding component 42. The mirror holding component 42 comprises a holding portion unit 42a which holds the concave mirror 25, and a holding plate 42b on which the holding portion unit 42a is mounted in a manner enabling adjustment of position and inclination. In this embodiment, the holding portion unit 42a of the mirror holding component 42 is made of fiber-reinforced resin. Specifically, the holding portion unit 42a contains glass reinforcing fibers 43, and the base material 44 of the holding portion unit 42a is of polycarbonate (see FIG. 14).

Referring to FIGS. 5 and 7 to 11, two screw portions are formed on each of the left and right of side of the edge (second edge) 36h surrounding the opening 36e for a total of four screws 83, as well as one positioning protrusion each on the right and left sides of the edge 36h for a total of two positioning protrusions 84. The screw portions 83 are provided at positions corresponding to the four corners of the opening 36e. Further, a female screw is formed in each of the screw portions 83. Six through holes 42c are formed in the mirror holding component 42, at positions corresponding to the positioning protrusions 84 and the female screws of the screw portions 83. The positioning protrusions 84 are inserted into the through holes 42c, and moreover male screws passing through the through holes 42c are screwed into the female screws of screws 83 to fix the holding plate 42b to the second tubular portion 36. The vicinities of the four corners of the holding plate 42b abut the tips of the four screw portions 83, and as a result the holding plate 42b is held at a predetermined position and posture with respect to the second tubular portion 36.

By causing the mirror holding component 42 to be in close contact with the edge 36h of the second tubular portion 36, the mirror holding component 42 can be fixed to the lower pedestal component 11 in a status in which the inclination and position of the concave mirror 25 are precisely determined. Further, the strength of installation of the concave mirror holding plate 42 onto the lower pedestal component 11 is increased, resulting in that shifts in inclination or position of the concave mirror 25 due to shocks can be prevented or alleviated. Moreover, by mounting the mirror holding plate 42 on the edge 36h surrounding the opening 36e, the rigidity of the lower pedestal component 11 is enhanced, resulting in that deformation of the lower pedestal component 11 due to shocks can be prevented or alleviated.

The variable diaphragm mechanism 26 is placed within the second tubular portion 36. An opening 36f is also formed in the end wall 36d of the second tubular portion 36, and the first aberration correction plate 27 is mounted in the opening 36f.

Figure 10:
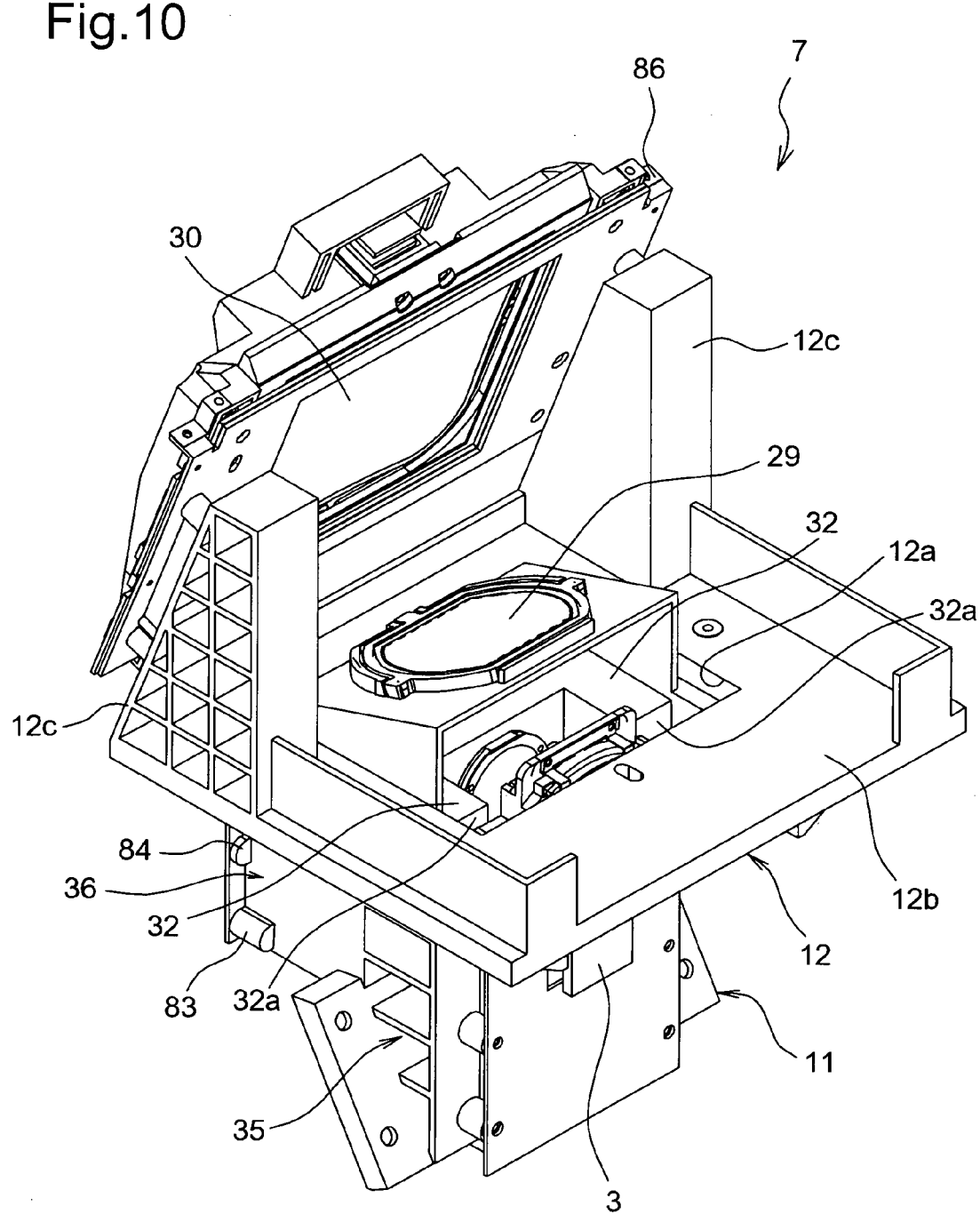
FIG. 10 is an external rear perspective view of the projection optical system unit, where a second free-forme curved mirror has been removed.

The convex mirror 28 is mounted on the second tubular portion 36 outside of the first aberration correction plate 27 of the second tubular portion 36. The installation structure of the convex mirror 28 is explained in detail below. Referring to FIGS. 10 and 12, the lower pedestal component 11 comprises a pair of mounting portions (fixing portions) 32, protruding outward from both left and right sides of the opening 36f. Further referring to FIG. 11, mounting surfaces 32a at the tips of the mounting portions 32 are parallel to the openings 35f and 36h, and are formed on the same side (the right side of the lower pedestal component 11 in FIG. 11) as the edge 35i on which is mounted the DMD 3. Further, two screw portions 33 and one positioning protrusion 34 are provided on each of the mounting surfaces 32a. The convex mirror 28 is fixed to the mirror holding component 45. Similarly to the above-described mirror holding component 42, the mirror holding component 45 of the convex mirror 28 comprises glass reinforcing fibers 43 and polycarbonate base material 44 (see FIG. 15). The mirror holding component 45 is fixed onto the mounting surfaces 32a by screwing screws into the screw portions 33. The mounting surfaces 32a for the mirror holding component 45 and the edge 35i onto which the DMD 3 is mounted are provided on the same side of the lower pedestal component 11. This achieves that, in a manufacturing process of the lower pedestal component 11, the mounting surfaces 32a and the edge 35i can be formed simultaneously using the same die. Consequently the positional relationship between the mounting surfaces 32a and the edge 35i can be highly precise, and the convex mirror 28 can be positioned precisely with respect to the DMD 3.

The second aberration correction plate 29 is mounted in the opening 36g formed on the upward outer side of the second tubular portion 36.

As explained above, the first and second free-form curved mirrors 30 and 31 are mounted on the upper pedestal portion 12. In this embodiment, the upper pedestal portion 12 consists of a single member. Referring to FIGS. 10 and 11, the upper pedestal portion 12 comprises a base portion 12b with an opening 12a formed in a center portion. The base portion 12b is fixed onto the platforms 37 of the lower pedestal component 11. As most clearly shown in FIGS. 9 and 10, the portion of the lower pedestal component 11 on which the second aberration correction plate 29 is mounted penetrates the opening 12a so as to be positioned above the base portion 12b. The first and second free-form curved mirrors 30 and 31 are respectively held by the mirror holding components 86 and 87, and these mirror holding components 86 and 87 are fixed to the upper pedestal portion 12. Specifically the mirror holding components 86 for the first free-form curved mirror 30 is fixed to a pair of support portions 12c provided on the front side of the base portion 12b, and the mirror holding component 87 of the second free-form curved mirror 31 is fixed to a back side portion of the base portion 12b.

By fixing the mirror holding components 86 and 87 which hold the first and second free-form curved mirrors 30 and 31 to the upper pedestal portion 12 formed separately from the lower pedestal component 11, manufacture and assembly of the lower and upper pedestal portions 11, 12 are facilitated. The inclination and position of the first and second free-form curved mirrors 30 and 31 have less influence to the projection optical system 6 compared with those of the the DMD 3, concave mirror 25, and convex mirror 28. Therefore, although the mirror holding components 86 and 87 for the first and second free-form curved mirrors 30 and 31 are fixed to the upper pedestal portion 12 formed separately from the lower pedestal component 11, the desired optical characteristics of the projection optical system 6 can be obtained.

The linear thermal expansion coefficient α1 of the lower pedestal component 11 in a specific direction (schematically indicated by the arrow D in FIG. 11) is set within the range between $0.8 \times 10^{-5}$ (1/K) and $3.0 \times 10^{-5}$ (1/K). Here, the specific direction D is a intermediate direction between a direction of a incident light beam and emitted light beam of one of the curved mirrors 25, 28, 30, and 31 held by the lower and upper pedestal components 11 and 12, and is substantially the same direction as the direction of the optical axes each of these curved mirrors. Setting the linear thermal expansion coefficient α1 of the lower pedestal component 11 in the specific direction D within the above-mentioned range prevents or alleviates increases in the distance between the DMD 3 and mirrors, increases in distances between mirrors, and degradation of the optical performance of the projection optical system 6 due to thermal expansions of the lower pedestal component 11 and optical components including mirrors without excessive increases in cost, resulting in that quality of images projected onto the screen 9 is improved. Hereafter, the reason for this is explained in detail.

Simulations were performed of the effect on the optical performance of a projection optical system 6 when the linear thermal expansion coefficient α1 in the specific direction D of the lower pedestal component 11 was varied in the range from $4.00 \times 10^{-6}$ to $6.2 \times 10^{-6}$, and the temperatures of the lower and upper pedestal components 11, four mirrors 25, 28, 30, and 31, and two aberration correction plates 27 and 29 are increased from normal temperature (for example 20° C.) to 40° C. Specifically, following items are calculated: the increases in the distance between the DMD 3 and concave mirror 25; the increases in the distance between mirrors; and shifts in back focus (BF shift amount) ΔBF due to change in powers of the optical components, these arising from the thermal expansion of the lower and upper pedestal portions 11, 12 and the optical components (mirrors 25, 28, 30, 31 and aberration correction plates 27, 29) constituting the projection optical system 6. Also, an approximating straight line representing changes in the BF shift amount ΔBF for changes in the linear thermal expansion coefficient α1 was determined. The BF shift amount ΔBF is the amount of shift in a focal position, taking the optical path to be from the screen 9 to the projection optical system 6. As shown schematically in FIG. 1, when the focal position shifts toward the rear side of the screen 9, the sign of the BF shift amount ΔBF is positive, and when the shift in focal position is toward the front side of the screen 9, the sign of the BF shift amount ΔBF is negative. The smaller the absolute value of the BF shift amount ΔBF is, the higher the quality of the image projected onto the screen 9 is.

In this simulation, the linear thermal expansion coefficients of the optical components were as indicated in Table 1 below. The dimensions of the image formation area of the DMD device 3 were taken to be 4.13×7.43 mm, and the screen dimensions were 790 mm×1405 mm. The distance between the screen 9 and the planar mirror 8 was 150 mm.

TABLE 1

| Optical component | Linear thermal expansion coefficient (1/K) |
|---|---|
| Concave mirror 25 | $7.8 \times 10^{-6}$ |
| First aberration correction plate 27 | $6.0 \times 10^{-5}$ |
| Convex mirror 28 | $9.4 \times 10^{-6}$ |
| Second aberration correction plate 29 | $6.0 \times 10^{-5}$ |
| First free-form curved mirror 30 | $7.0 \times 10^{-5}$ |
| Second free-form curved mirror 31 | $7.0 \times 10^{-5}$ |

Figure 13:
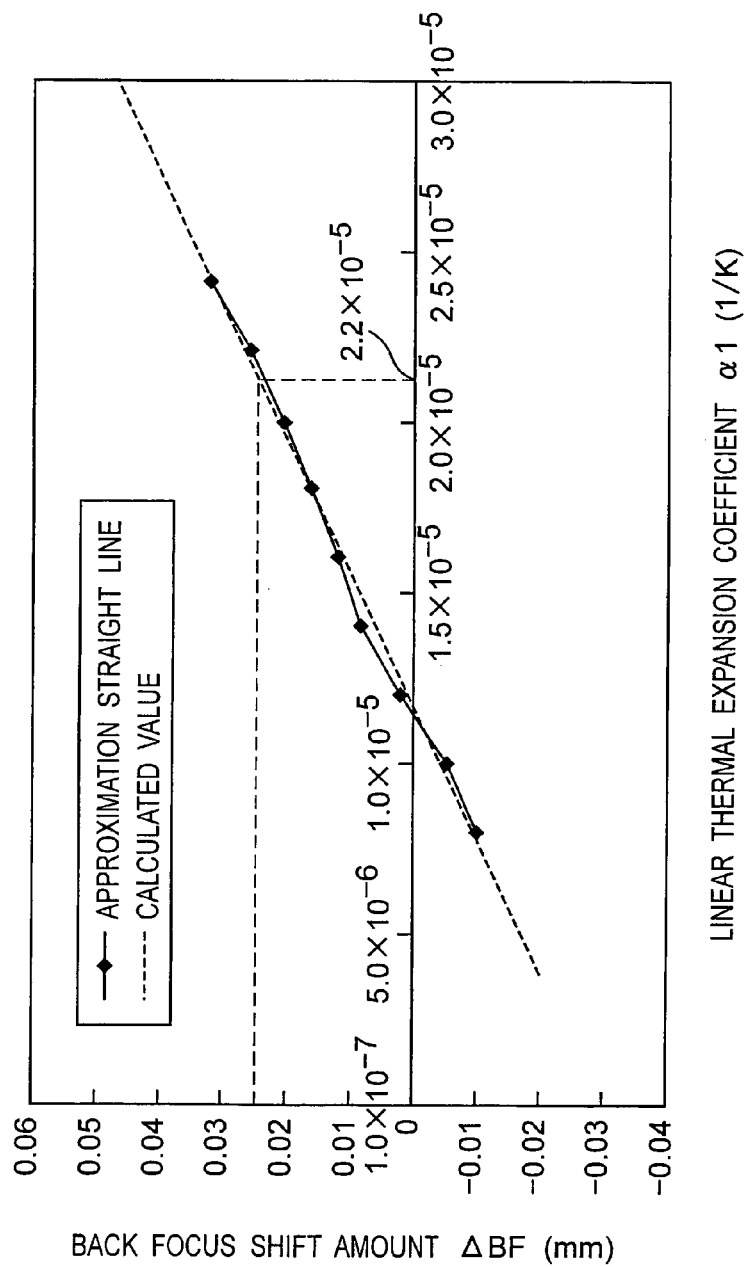
FIG. 13 is a diagram showing a relation between a linear thermal expansion coefficient and a back focus shift amount.

The simulation results are shown in Table 2 and FIG. 13. For the projection optical system 6 of this embodiment, changes in power due to thermal expansion of the first and second free-form curved mirrors 30 and 31, changes in the distance between the concave mirror 25 and first free-form curved mirror 30, and changes in the distance between the first free-form curved mirror 30 and the second free-form curved mirror 31, had little influences on the back focus shift amount ΔBF. Further, because the first and second aberration correction plates 27 and 29 have almost no power, they do not affect the back focus shift amount ΔBF. On the other hand, changes in the distance between the DMD device 3 and concave mirror 25 have the most significant influence on the back focus shift amount ΔBF.

TABLE 2

| Linear thermal expansion coefficient α1 (1/K) | Calculated value of BF shift amount ΔBF (mm) | ΔBF approximation straight line for BF shift amount ΔBF (mm) |
|---|---|---|
| $0.40 \times 10^{-5}$ | — | $-1.94 \times 10^{-2}$ |
| $0.60 \times 10^{-5}$ | — | $-1.43 \times 10^{-2}$ |
| $0.80 \times 10^{-5}$ | $-0.01$ | $-9.13 \times 10^{-3}$ |
| $1.00 \times 10^{-5}$ | $-0.005$ | $-4.02 \times 10^{-3}$ |
| $1.20 \times 10^{-5}$ | $0.002$ | $1.10 \times 10^{-3}$ |
| $1.40 \times 10^{-5}$ | $0.008$ | $6.22 \times 10^{-3}$ |
| $1.60 \times 10^{-5}$ | $0.012$ | $1.13 \times 10^{-2}$ |
| $1.80 \times 10^{-5}$ | $0.016$ | $1.64 \times 10^{-2}$ |
| $2.00 \times 10^{-5}$ | $0.021$ | $2.16 \times 10^{-2}$ |
| $2.20 \times 10^{-5}$ | $0.026$ | $2.67 \times 10^{-2}$ |
| $2.40 \times 10^{-5}$ | $0.032$ | $3.18 \times 10^{-2}$ |
| $2.60 \times 10^{-5}$ | — | $3.69 \times 10^{-2}$ |
| $2.80 \times 10^{-5}$ | — | $4.20 \times 10^{-2}$ |
| $3.00 \times 10^{-5}$ | — | $4.71 \times 10^{-2}$ |
| $3.20 \times 10^{-5}$ | — | $5.23 \times 10^{-2}$ |
| $3.40 \times 10^{-5}$ | — | $5.74 \times 10^{-2}$ |
| $3.60 \times 10^{-5}$ | — | $6.25 \times 10^{-2}$ |
| $3.80 \times 10^{-5}$ | — | $6.76 \times 10^{-2}$ |
| $4.00 \times 10^{-5}$ | — | $7.27 \times 10^{-2}$ |
| $4.20 \times 10^{-5}$ | — | $7.78 \times 10^{-2}$ |
| $4.40 \times 10^{-5}$ | — | $8.30 \times 10^{-2}$ |
| $4.60 \times 10^{-5}$ | — | $8.81 \times 10^{-2}$ |
| $4.80 \times 10^{-5}$ | — | $9.32 \times 10^{-2}$ |
| $5.00 \times 10^{-5}$ | — | $9.83 \times 10^{-2}$ |
| $5.20 \times 10^{-5}$ | — | $1.03 \times 10^{-1}$ |
| $5.40 \times 10^{-5}$ | — | $1.09 \times 10^{-1}$ |
| $5.60 \times 10^{-5}$ | — | $1.14 \times 10^{-1}$ |
| $5.80 \times 10^{-5}$ | — | $1.19 \times 10^{-1}$ |
| $6.00 \times 10^{-5}$ | — | $1.24 \times 10^{-1}$ |
| $6.20 \times 10^{-5}$ | — | $1.29 \times 10^{-1}$ |

The back focus shift amount ΔBF needs to be held within the range of a focal depth of the projection optical system 6. For an F number of F4.0, the focal depth is approximately $\pm 4.5 \times 10^{-2}$ mm. As indicated in Table 2 and FIG. 13, the BF shift amounts ΔBF when the temperature rises are increased with increases in the linear thermal expansion coefficient α1 in the specific direction D of the lower pedestal component 11. The BF shift amount ΔBF for the linear thermal expansion coefficient α1 of $3.0 \times 10^{-5}$ (1/K) is $4.71 \times 10^{-5}$, which is substantially the same as the focal depth for an F number of F4.0. Therefore, the linear thermal expansion coefficient $\alpha 1$ of the lower pedestal component 11 set to $3.0 \times 10^{-5}$ (1/K) or below can substantially suppress the BF shift amount $\Delta$BF equal to or less than the focal depth for F4.0 ($\pm 4.5 \times 10^{-2}$ mm).

As the linear thermal expansion coefficient $\alpha 1$ of the lower pedestal component 11 in the specific direction D decreases, a sign of the BF shift amount $\Delta$BF changes from positive to negative in the vicinity of 1.00 to $1.20 \times 10^{-5}$. For example, when the linear thermal expansion coefficient $\alpha 1$ is $0.8 \times 10^{-5}$ (1/K), the BF shift amount $\Delta$BF is $-9.13 \times 10^{-3}$ mm. As the linear thermal expansion coefficient $\alpha 1$ further decreases, the absolute value of the negative back focus shift amount increases. Therefore, if the value of the linear thermal expansion coefficient $\alpha 1$ is reduced to a certain extent, then further reducing the value of the linear thermal expansion coefficient $\alpha 1$ actually results in degrading in the optical performance of the projection optical system 6. On the other hand, the linear thermal expansion coefficient of various kinds of material that can be commonly used for the lower pedestal component 11 is approximately $0.8 \times 10^{-5}$ to $10 \times 10^{-5}$ (1/K). For example, the linear thermal expansion coefficient of SUS 430 is $1.0 \times 10^{-5}$ (1/K), and the linear thermal expansion coefficient of glass is approximately $1.0 \times 10^{-5}$ (1/K). Moreover, the linear thermal expansion coefficient of polycarbonate containing 30% glass fiber is approximately $1.4 \times 10^{-5}$ to $2.0 \times 10^{-5}$ (1/K) in a direction of the glass fibers, and is approximately $6.0 \times 10^{-5}$ (1/K) in directions perpendicular to the glass fibers. And, the linear thermal expansion coefficient of BMC (Bulk Molding Compound) is approximately 1.4 to $2.2 \times 10^{-5}$ (1/K). Therefore, material having a linear thermal expansion coefficient much smaller than $1.0 \times 10^{-5}$ (1/K) is extremely expensive, resulting in excessive cost. For these reasons, the linear thermal expansion coefficient $\alpha 1$ in the specific direction D of the lower pedestal component 11 was set at $0.8 \times 10^{-5}$ (1/K) or higher.

In the case of the brighter F number F2.8, the focal depth has a tolerance of approximately $\pm 2.5 \times 10^{-2}$. As is clear from FIG. 13, when the linear thermal expansion coefficient $\alpha 1$ of the lower pedestal component 11 in the specific direction D is $2.2 \times 10^{-5}$ (1/K), the BF shift amount $\Delta$BF is $2.5 \times 10^{-2}$ mm. Therefore, it is preferable that the linear thermal expansion coefficient $\alpha 1$ of the lower pedestal component 11 in the specific direction D is set in the range from $0.8 \times 10^{-5}$ (1/K) to $2.2 \times 10^{-5}$ (1/K).

For reasons similar to those for the lower pedestal component 11, the linear thermal expansion coefficient of the upper pedestal portion 12 in the specific direction D is likewise set in the range from $0.8 \times 10^{-5}$ (1/K) to $3.0 \times 10^{-5}$ (1/K). It is more preferable that the linear thermal expansion coefficient of the upper pedestal portion 12 in the specific direction D is set in the range from $0.8 \times 10^{-5}$ (1/K) to $2.2 \times 10^{-5}$ (1/K).

In the projection optical system 6 of this embodiment, having a plurality of curved mirrors 25, 28, 30, and 31, and with the concave mirror 25 and convex mirror 28 positioned in this order from the DMD 3, on the condition that there is no significant change in the dimensions of the optical components, especially the dimensions of an image formation area of the DMD 3, there is almost no difference in the above described preferred linear thermal expansion coefficient values for the lower and upper pedestal portions 11 and 12.

Figure 14A:
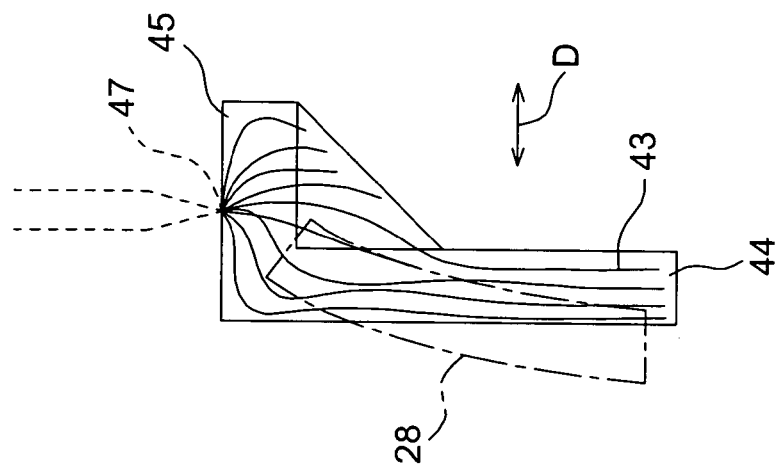
FIG. 14A is a schematic diagram showing positioning of reinforcing fibers within material of a mirror holding member for a convex mirror.
Figure 15A:
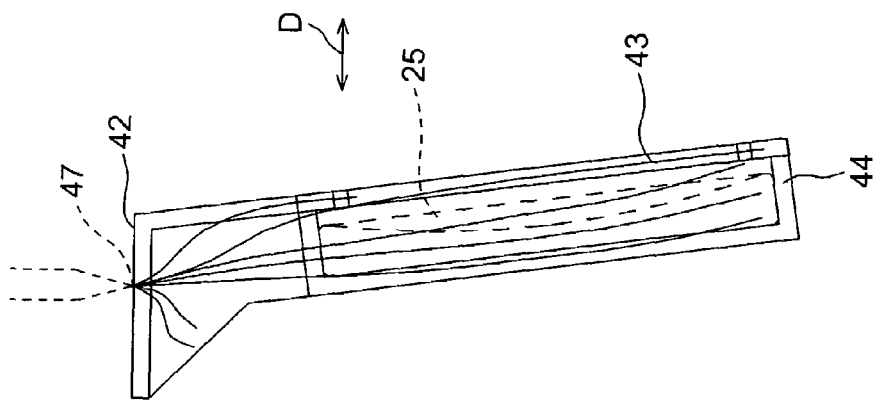
FIG. 15A is a schematic diagram showing positioning of reinforcing fibers within material of a mirror holding member for a concave mirror.
Figure 15B:
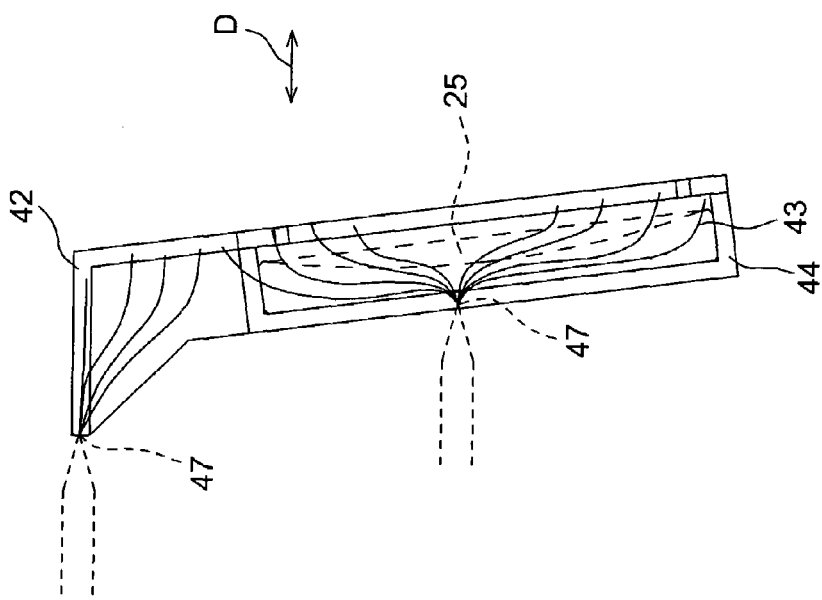
FIG. 15B is a schematic diagram showing positioning of reinforcing fibers in a comparison example.

Referring to FIGS. 14A and 15B, because the mirror holding components 42 and 45 contain glass reinforcing fibers 43 as explained above, the linear thermal expansion coefficients of the mirror holding components 42 and 45 have anisotropy. Specifically, the linear thermal expansion coefficient in the length direction of the glass reinforcing fibers 43 is smaller than the linear thermal expansion coefficients in other directions. As shown in FIGS. 14A and 15A, length directions of the glass reinforcing fibers 43, in which the linear thermal expansion coefficient is small, is along the specific direction D, that is, the direction of the optical axes of the concave mirror 25 and convex mirror 28. By having the direction of low linear thermal expansion coefficient of the mirror holding components 42, 45 directed in the specific direction D, elongation due to thermal expansion of the mirror holding components 42 and 45 in the optical axis direction is suppressed, and shifts in position of the concave mirror 25 and convex mirror 28 in the optical axis direction can be suppressed.

Figure 14B:
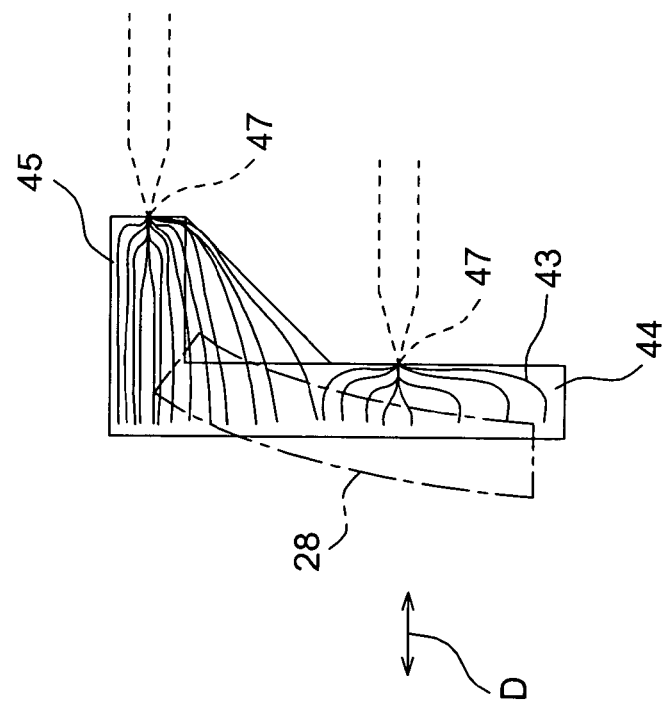
FIG. 14B is a schematic diagram showing positioning of reinforcing fibers in a comparison example.

The length direction of glass reinforcing fibers 43 substantially coincides with the direction of flow of the base material 44 during injection molding. Therefore, the base material 44 is injected into a die from a gate 47 facing the specific direction D shown in FIG. 14A, rather than from a gate 47 facing a direction perpendicular to the specific direction D as shown in FIG. 14B. Similarly for the mirror holding component 42 of the concave mirror 25, the base material 44 is injected into the die from a gate facing the specific direction D as shown in FIG. 15A, and not from a gate facing a direction perpendicular to the specific direction D, as shown in FIG. 15B.

Figure 7:
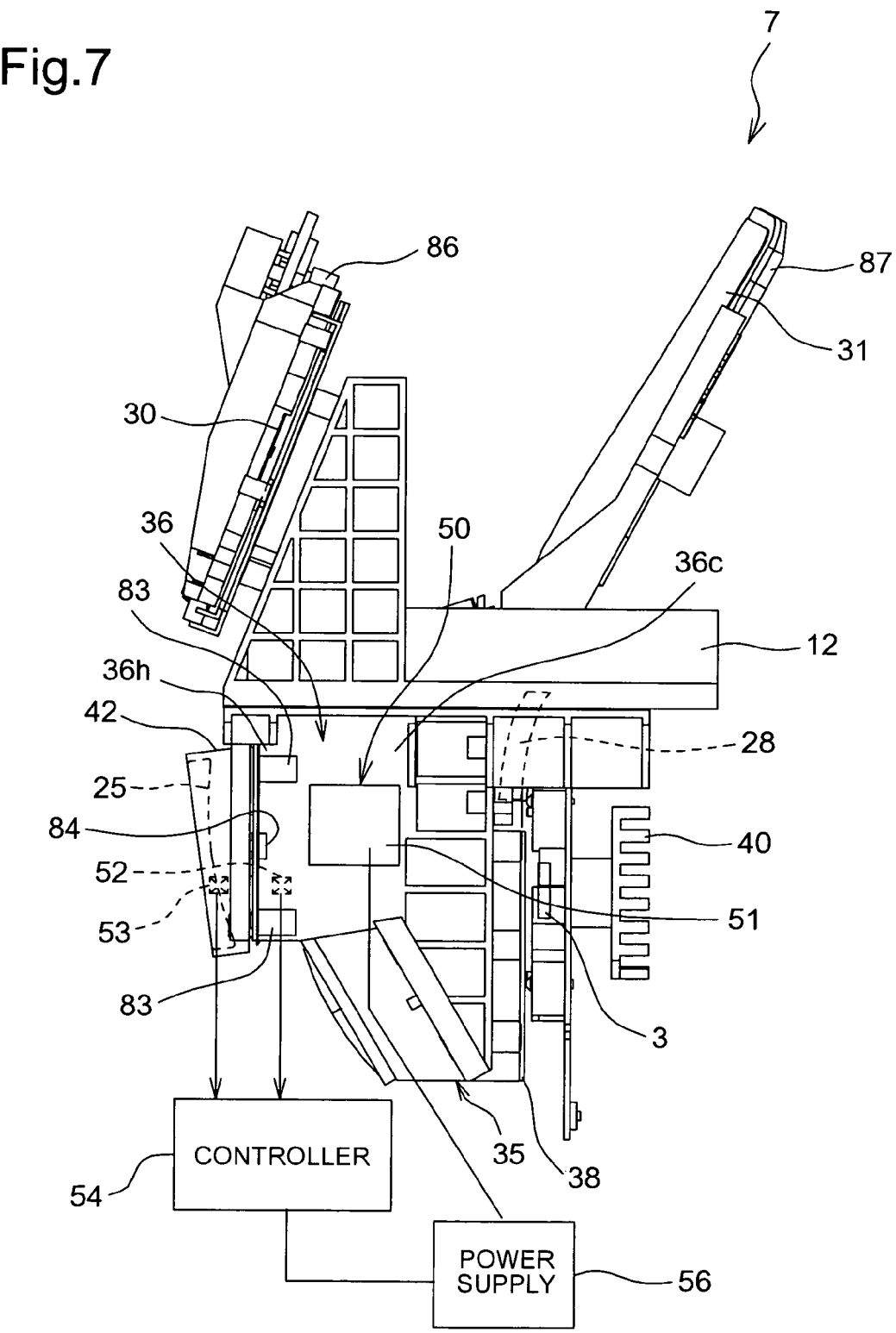
FIG. 7 is a right side view of the projection optical system unit.
Figure 8:
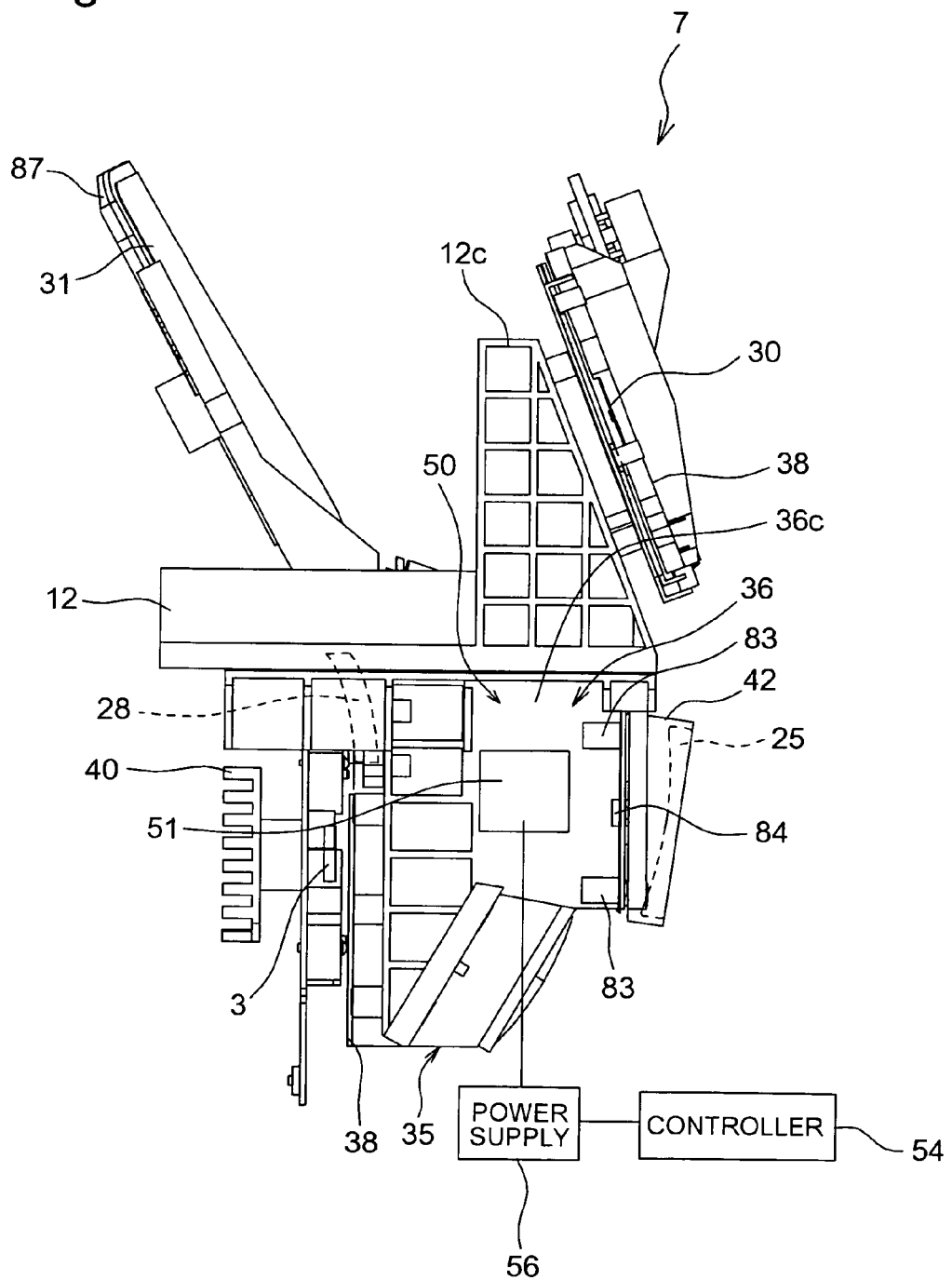
FIG. 8 is a left side view of the projection optical system unit.
Figure 9:
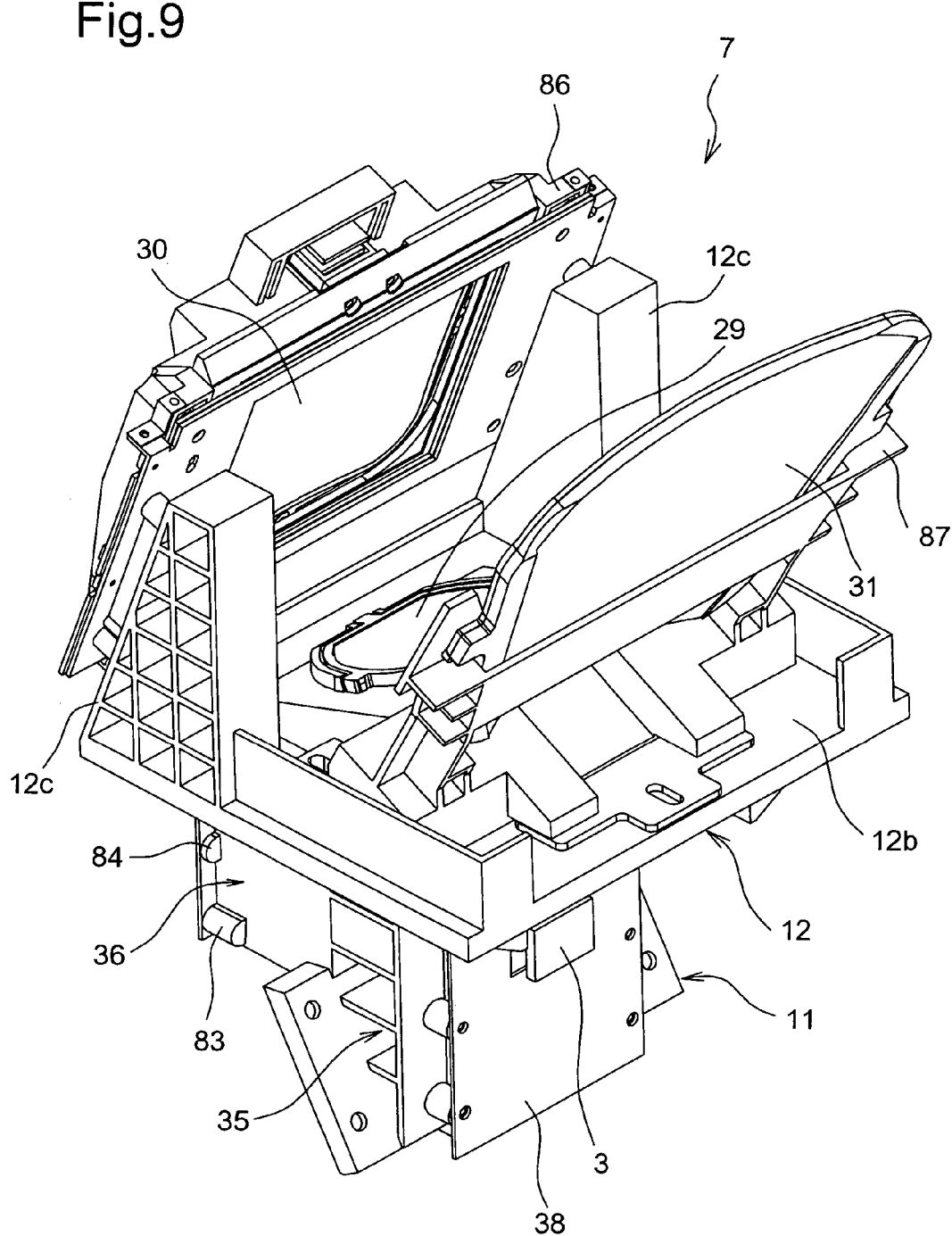
FIG. 9 is an external rear perspective view of the projection optical system unit.

Next, the heating device 50 is explained. Referring to FIGS. 4, 7, and 8, the heating device 50 comprises surface heaters 51 fixed to outsides of the pair of side walls 35c of the lower pedestal component 11 (first tubular portion 35), temperature sensors 52 positioned within the side walls 35c, a temperature sensor 53 which detects the temperature of the concave mirror 25 and is positioned within the mirror holding component 42, and a controller 54. As shown schematically in FIG. 4, the surface heaters 51 enclose electrical heating wire 55 between two thin aluminum sheets or other sheets with good thermal conductivity. The electrical heating wire 55 emits heat as a result of electric power supplied by a power supply 56.

Whereas the concave mirror 25 reflects the projection light, the projected light is not directly incident on the lower pedestal component 11. This cause a tendency for the mirror holding component 42 to become hotter than the lower pedestal component 11. For example, even under a normal temperature (approximately 20° C.), the concave mirror 25 emits heat and the temperature may rise to approximately 40° C. The change in power of the concave mirror 25 due to the thermal deformation and the thermal expansion of the lower pedestal component 11 have significant influences on the optical performance, particularly on the back focus shift amount $\Delta$BF described above. A change in the power of the concave mirror 25 due to the thermal deformation tends to increase the back focus shift amount $\Delta$BF in the positive direction (see FIG. 1). Conversely, the thermal expansion of the lower pedestal component 11 tends to increase the back focus shift amount $\Delta$BF in the negative direction. Therefore if a temperature difference between the concave mirror 25 and the lower pedestal component 11 is small, the influences on the back focus shift amount $\Delta$BF exerted by the change in power of the concave mirror 25 due to thermal deformation and by the thermal expansion of the lower pedestal component 11 will cancel each other, resulting in that increases in the back focus shift amount $\Delta$BF due to increases in temperature can be alleviated. However, if the temperature difference between the concave mirror 25 and the lower pedestal component 11 is large, the effect on the back focus shift amount ΔBF of any one of the change in power of the concave mirror 25 due to thermal deformation and the thermal expansion of the lower pedestal component 11 will become greater than the effect on the backfocus shift amount ΔBF of the other. Consequently when the temperature difference between the concave mirror 25 and the lower pedestal component 11 is large, the increase in back focus shift amount ΔBF due to the increase in temperature becomes significant.

The controller 54 controls a supply of power by the power supply 56 to the surface heaters 51 so as to reduce the temperature difference between the lower pedestal component 11 and the mirror holding component 42, based on the temperature of the lower pedestal component 11 detected by the temperature sensor 52 and the temperature of the concave mirror 25 detected by the temperature sensor 53. The controller 54 reduces the temperature difference between the concave mirror 25 and the lower pedestal component 11 so that the back focus shift amount ΔBF arising from temperature increases is maintained within the range of the focal depth corresponding to the F number of the projection optical system 6. Specifically, when the temperature of the lower pedestal component 11 is judged to be lower than that of the concave mirror 25 by a predetermined range based on the temperatures detected by the temperature sensors 52 and 53, the controller 54 causes power to be supplied by the power supply 56 to the electrical heating wire 55 of the surface heaters 51, causing emission of heat. On the other hand, when the temperature of the lower pedestal component 11 is judged to be higher than that of the concave mirror 25 by the predetermined amount based on the temperatures detected by the temperature sensors 52 and 53, the controller 54 shuts off the power supply from the power supply 56 to the electrical heating wire 55 of the surface heaters 51.

By lowering the temperature difference between the concave mirror 25 and the lower pedestal component 11 within the predetermined range, increases in the back focus shift amount ΔBF arising from the difference in thermal expansion of the concave mirror 25 and lower pedestal component 11 can be reduced, and the preferable optical performance according to the optical design of the projection optical system 6 can be maintained even when temperatures rise. Moreover, because the heat emission by the surface heaters 51 is controlled based on the temperatures detected by the temperature sensors 52 and 53, the concave mirror 25 and lower pedestal component 11 can be reliably maintained in a status where the temperature difference therebetween is small.

Since the lower pedestal component 11 is heated by the surface heaters 51, the projection optical system 6 is used at temperatures higher than the normal temperature. Therefore, the lower pedestal component 11, upper pedestal portion 12, mirror holding component 42, mirror holding component 45, curved mirrors 25, 28, 30, 31, and other components constituting the projection optical system unit 7 are optically designed so as to offer desired optical performances when they are used in a state of thermal expansion due to high temperature conditions.

Any one of the temperature sensors 52 and 53 may be provided, with the surface heaters 51 controlled by the controller 54 based on the temperature detected thereby. Further, because the temperature of the mirror holding component 42 is closely correlated with the temperature of the concave mirror 25, the temperature of the mirror holding component 42 may be detected by a temperature sensor. Temperature sensors may also be provided in mirrors other than the concave mirror 25 (for example, in the convex mirror 28) or in mirror holders holding these mirrors, and these detected temperatures may be used by the controller 54.

A major characteristic of the rear projection TV 1 of this embodiment is as follows. Because the image formation device holding plate 38 for the DMD device 3, mirror holding component 42 for the concave mirror 25, and mirror holding component 45 for the curved mirror 28 are mounted on a common lower pedestal component 11, the inclinations and distances of the concave mirror 25 and convex mirror 28 with respect to the DMD 3 can be appropriately set and maintained, resulting in that the projection optical system offers the optical performance according to the optical design. In particular, the shifts in the inclination and the distance of the mirrors 25 and 28 with respect to the DMD 3 arising from shocks and from thermal expansion during temperature changes can be prevented or alleviated, resulting in high reliability.

Further, because the linear thermal expansion coefficients of the lower pedestal component 11 and upper pedestal portion 12 in the specific direction D are set to between $0.8 \times 10^{-5}$ (1/K) and $3.0 \times 10^{-5}$ (1/K), degradation of the optical performance of the projection optical system due to expansion of the distances between the DMD 3 and mirrors, expansion of the distance between mirrors, and changes in the powers of the optical components, arising from thermal expansion of the lower and upper pedestal portions 11, 12 and thermal expansion of optical components including mirrors, can be prevented or alleviated without excessive cost increases, resulting in that the quality of the images projected onto the screen 9 is improved.

Furthermore, because the directions of the mirror holders 42 and 45 in which the linear thermal expansion coefficients are small is directed to the specific direction, shifts in the positions of the concave mirror 25 and convex mirror 28 in the optical axis direction due to thermal expansion can be suppressed.

Moreover, by heating the lower pedestal component 11 by the heating device, the temperature difference between the lower pedestal component 11 and the concave mirror 25 can be reduced, resulting in that the degradation of optical performance due to from differences in thermal expansion can be prevented or alleviated. Even when the constructions or materials of the pedestal components and/or the configuration of the projection optical system differ from those of this embodiment, the heating device 50 can be used to control the temperature difference between mirrors and pedestal components so as to keep the back focus shift amount within a predetermined prefer range.

Second Embodiment

Figure 16:
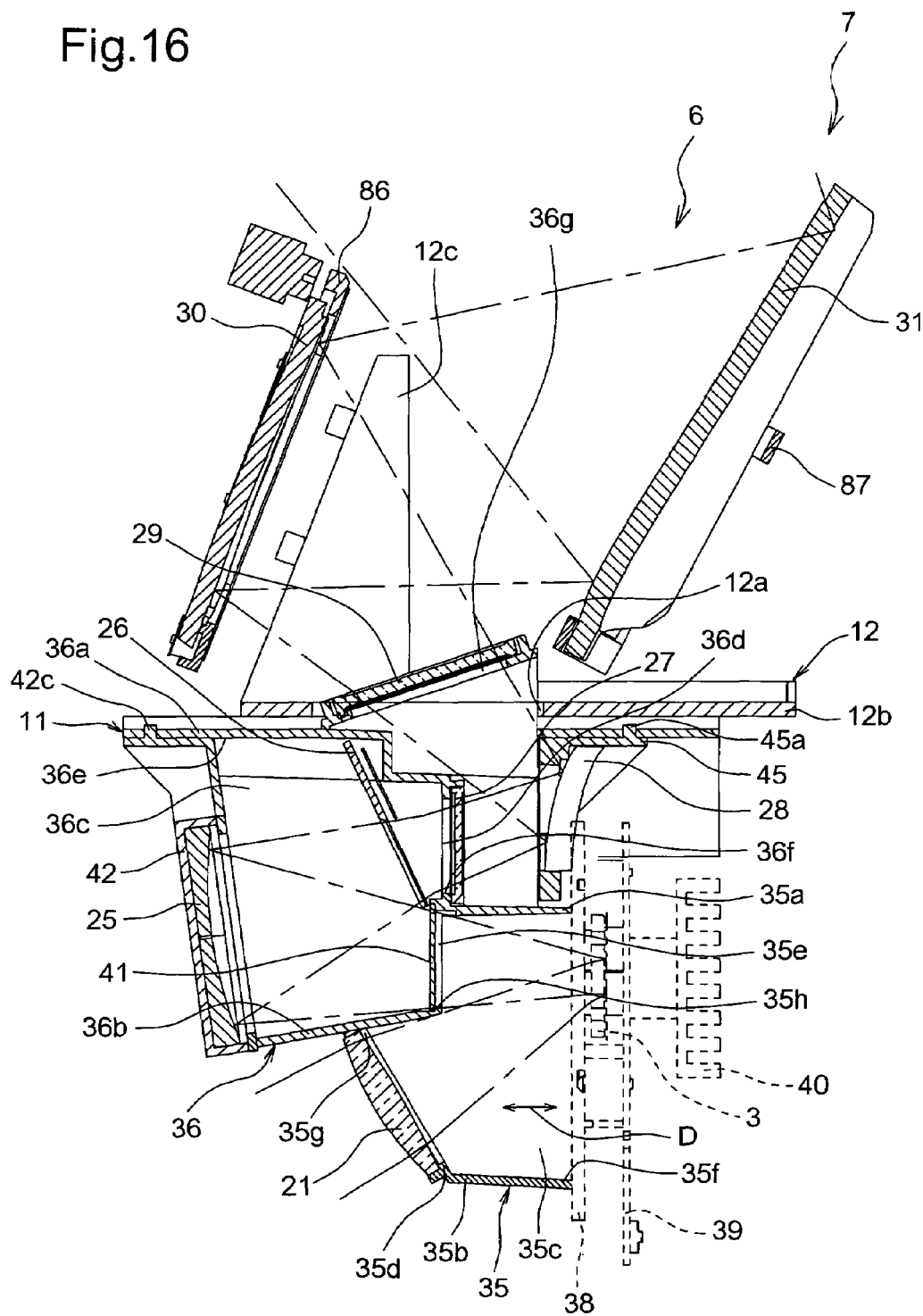
FIG. 16 is a cross sectional view of a projection optical system unit according to a second embodiment of the present invention.

The second embodiment of this invention shown in FIG. 16 differs from the first embodiment with respect to the structures of the lower pedestal component 11, mirror holding component 42 for the concave mirror 25, and mirror holding component 45 for the convex mirror 28.

The top wall 36a of the second tubular portion 36 extends in the horizontal direction (to the right in FIG. 17) beyond the end wall 36d. Further, the mirror holding component 42 for the concave mirror 25 comprises a protrusion 42c on the upper-left side in FIG. 11, which is the side opposite to the convex mirror 28 facing with the concave mirror 25. The protrusion 42c is fixed to the top wall 36a of the second tubular portion 36. The mirror holding component 45 comprises a protrusion 45a on the upper-right side in FIG. 17, which is the side opposite to the concave mirror 25 facing with the convex mirror 28. The protrusion 45a is fixed to the top wall 36a of the second tubular portion 36. As in the first embodiment, the mirror holding components 42 and 45 comprise a polycarbonate base material 44 containing glass reinforcing fibers 43 (see FIGS. 14 and 15).

The linear thermal expansion coefficients α2 and α3 in the specific direction D of the mirror holding component 42 holding the concave mirror 25 and of the mirror holding component 45 holding the convex mirror 28 are set to values larger than the linear thermal expansion coefficient α1 in the specific direction D of the lower pedestal component 11. Since the linear thermal expansion coefficient α1 of the lower pedestal component 11 in the specific direction D is set in the range between $0.8 \times 10^{-5}$ (1/K) and $3.0 \times 10^{-5}$ (1/K) as explained above, the linear thermal expansion coefficients α2 and α3 of the mirror holding components 42 and 45 in the specific direction D are set in for example the range from $3.0 \times 10^{-5}$ (1/K) to $6.0 \times 10^{-5}$ (1/K). Further, as explained above, the mirror holding component 42 is fixed to the top wall 36 at the protrusion 42c opposite to the convex mirror 28 and, the mirror holding component 45 is fixed to the top wall 36 at the protrusion 45a opposite toe the concave mirror 25. These arrangements suppress enlargements of the distance between the convex mirror 28 and the concave mirror 25 due to thermal expansion of the lower pedestal component 11. The reason for this is explained below with reference to FIG. 17.

Figure 17:
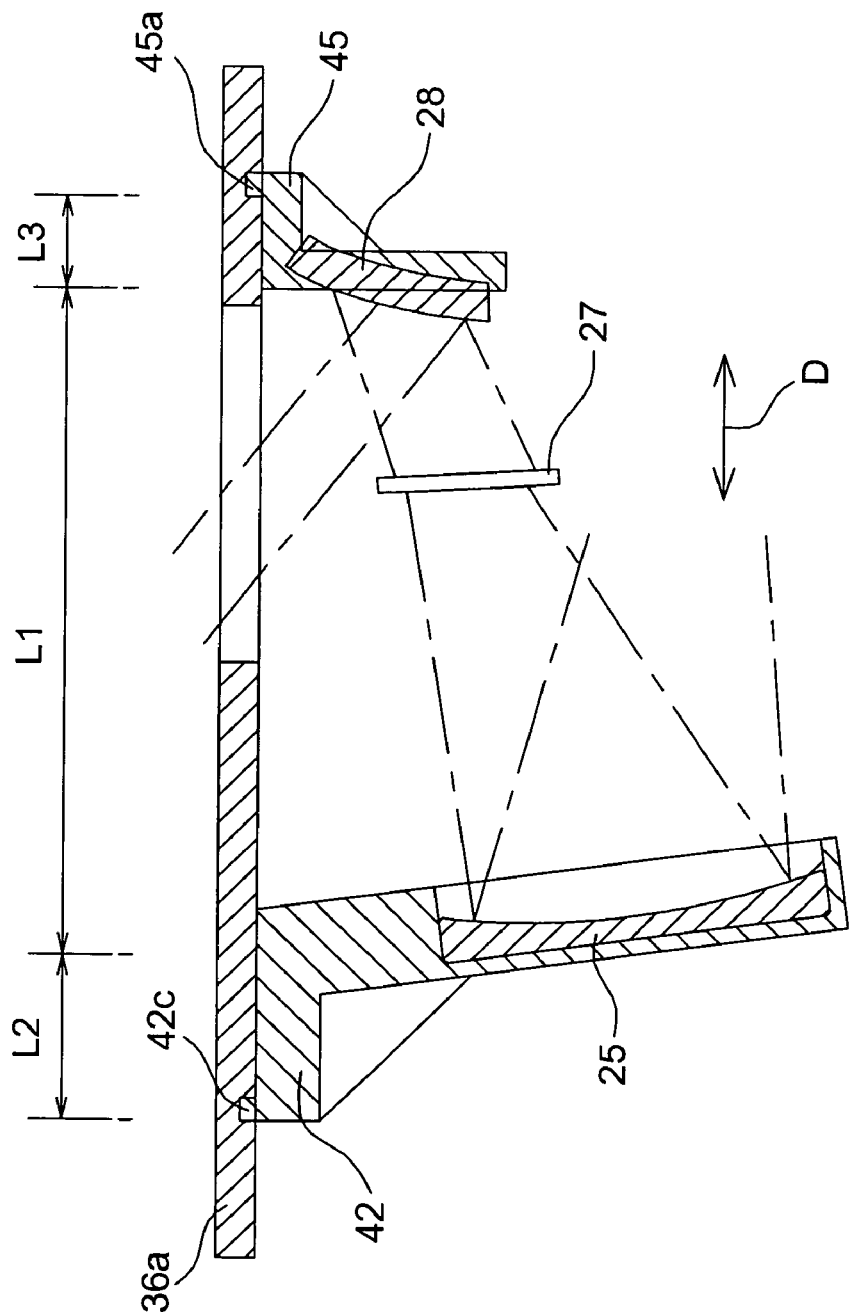
FIG. 17 is a schematic cross sectional view of a concave mirror, convex mirror, and lower pedestal member.

FIG. 17 shows schematically the top wall 36a of the second tubular portion 36 of the lower pedestal component 11, and the mirror holding components 42, 45 fixed thereonto. If L1 is the distance in the specific direction D between the convex mirror 28 and the concave mirror 25 under the normal temperature (for example 20° C.), and a rise in temperature is ΔT, then an amount of increase ΔL1 in the distance L1 due to the thermal expansion of the lower pedestal component 11 is expressed by equation (1) shown below.

$$\Delta L1 = L1 \times \alpha 1 \times \Delta T \quad (1)$$

Further, if L2 is a distance in the specific direction D between the concave mirror 25 and the protrusion 42c under the normal temperature, and similarly, L3 is a distance in the specific direction D between the convex mirror 28 and the protrusion 45a under the normal temperature, then an amount of increase ΔL123 in a distance L1+L2+L3 between the protrusion 45a and the protrusion 42a due to thermal expansion is expressed by the following equation (2).

$$\Delta L123 = (L1+L2+L3) \times \alpha 1 \times \Delta T \quad (2)$$

An increase in temperature also causes thermal expansion of the mirror holding components 42 and 45. The amounts of increase ΔL2 and ΔL3 in the distances L2 and L3 due to the thermal expansion of the mirror holding components 42 and 45 when the temperature rises by ΔT are expressed by the following equations (3) and (4).

$$\Delta L2 = L2 \times \alpha 2 \times \Delta T \quad (3)$$

$$\Delta L3 = L3 \times \alpha 3 \times \Delta T \quad (4)$$

Because the mirror holding component 42 is fixed at the protrusion 42c opposite to the convex mirror 28, thermal expansion of the mirror holding component 42 causes the concave mirror 25 to move by an amount ΔL2 toward the convex mirror 28. Similarly, because the mirror holding component 45 is fixed at the protrusion 45a opposite to the concave mirror 25, the thermal expansion of the mirror holding component 45 causes the convex mirror 28 to move by an amount ΔL3 toward the concave mirror 25. Accordingly an actual amount of increase ΔL1' in the distance L1 due to the thermal expansion is, as indicated by equation (5) below, a value obtained by subtracting the increase amounts ΔL2 and ΔL3 from the increase amount ΔL123, achieving that an expansion of the distance L1 between the concave mirror 25 and the convex mirror 28 due to thermal expansion of the lower pedestal component 11 is suppressed. Especially, because the linear thermal expansion coefficients α2 and α3 of the mirror holding components 42 and 45 are larger than the linear thermal expansion coefficient α1 of the lower pedestal component 11, the expansion of the distance L1 between the concave mirror 25 and the convex mirror 28 due to thermal expansion of the lower pedestal component 11 can be effectively suppressed.

$$\begin{aligned}\Delta L1' &= \Delta L123 \cdot \Delta L2 \cdot \Delta L3 \\ &= \{(L1+L2+L3) \times \alpha 1 \times \Delta T\} \cdot (L2 \times \alpha 2 \Delta T) \cdot \\ &\quad (L3 \times \alpha 3 \Delta T) \\ &= L1 \times \alpha 1 \times \Delta T \cdot L2 \times (\alpha 2 \cdot \alpha 1) \times \Delta T \cdot \\ &\quad L3 \times (\alpha 3 \cdot \alpha 1) \times \Delta T\end{aligned} \quad (5)$$

In case that the distances L1, L2, and L3 are respectively 80 mm, 15 mm, and 15 mm, the linear thermal expansion coefficients α1, α2, and α3 are respectively $2.0 \times 10^{-5}$ (1/K), $6.0 \times 10^{-5}$ (1/K), and $6.0 \times 10^{-5}$ (1/K), and the increase in temperature ΔT is 40° C., the amount of increase ΔL1 in the distance L1 obtained from equation (1) is $6.4 \times 10^{-2}$ mm. Comparing to this, the actual increase amount ΔL1' obtained from equation (5) in this case is reduced to $1.6 \times 10^{-2}$ mm.

As discussed above, by setting the linear thermal expansion coefficients of the mirror holding components 42 and 45 in the specific direction D to be larger than the linear thermal expansion coefficient of the lower pedestal component 11 in the specific direction D, the expansion in the distance between the concave mirror 25 and the convex mirror 28 due to thermal expansion can be alleviated.

Other configuration and operation in the second embodiment are similar to those in the first embodiment, and so the same symbols are assigned to the same elements, and redundant explanations are omitted.

Third Embodiment

Figure 18:
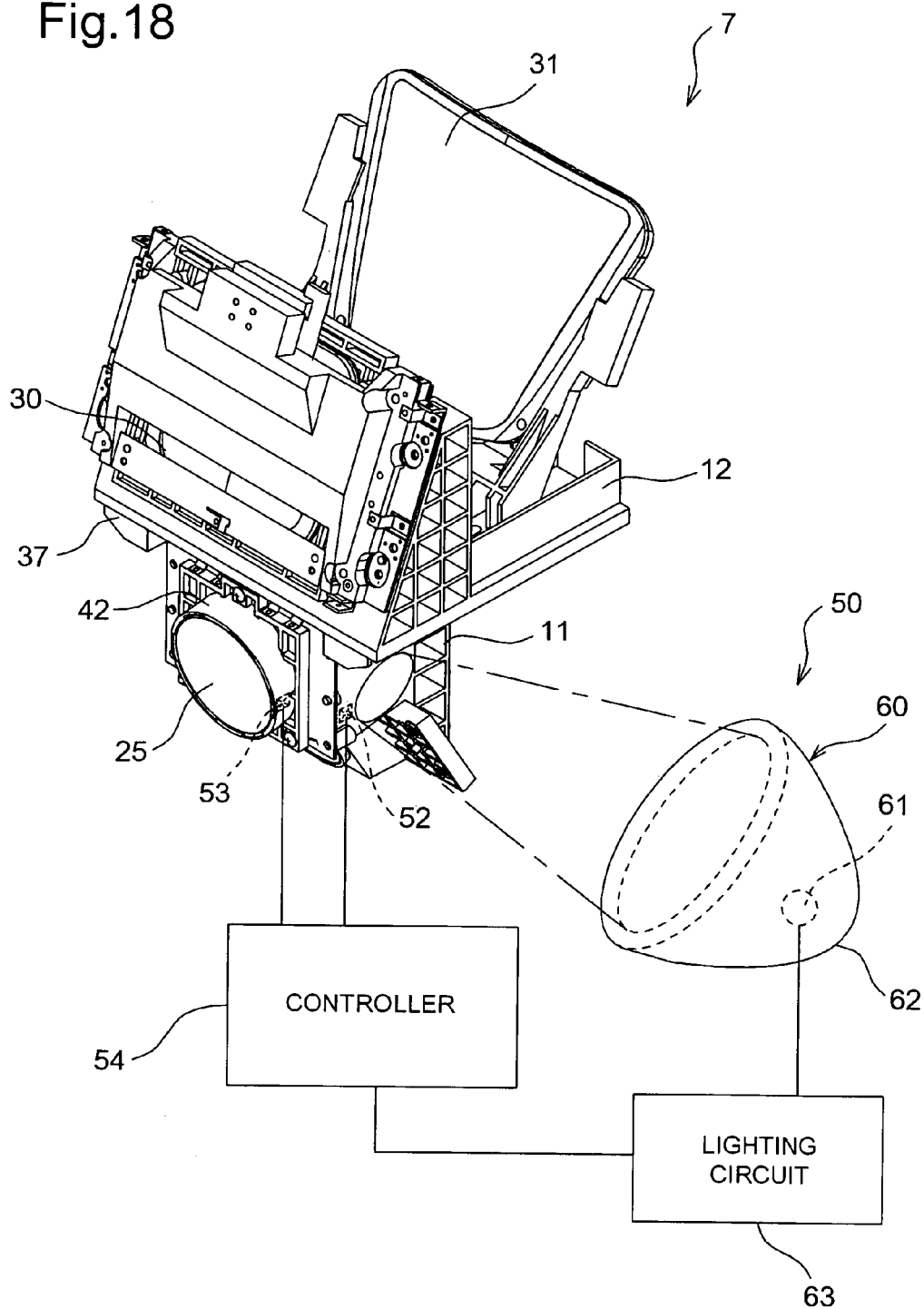
FIG. 18 is an external perspective view of a projection optical system unit according to a third embodiment of the invention.

The third embodiment of this invention shown in FIG. 18 differs from the first embodiment with respect to the configuration of the heating device 50. The heating device 50 of this embodiment comprises a heating light source 60, which irradiates the side walls 35c of the first tubular portion 35 of the lower pedestal component 11 with light to heat the walls. This heating light source 60 comprises a lamp 61, an elliptical mirror 62 to focus the light emitted by the lamp 61 on the side walls 35c, and a lighting circuit 63 for the lamp 61.

The controller 54 controls the lighting and extinguishing of the heating light source 60 in order to reduce the temperature difference between the lower pedestal component 11 and the mirror holding component 42, based on the temperature of the lower pedestal component 11 detected by the temperature sensor 52 mounted on the lower pedestal component 11 and on the temperature of the concave mirror 25 detected by the temperature sensor 53 mounted on the mirror holding component 42. Specifically, when the temperature of the lower pedestal component 11 is judged to be lower than the temperature of the concave mirror 25 exceeding the predetermined range based on the temperatures detected by the temperature sensors 52 and 53, the controller 54 drives the lighting circuit 63 to cause lighting of the lamp 61, and the light emitted by the lamp 61 heats the lower pedestal component 11. On the other hand, when the temperature of the lower pedestal component 11 is judged to be higher than the temperature of the concave mirror 25 exceeding the predetermined range, the controller 54 turns off driving of the lighting circuit 63, causing the lamp 61 to be extinguished. By using the heating light source 60 to heat the lower pedestal component 11 and reduce the temperature difference between the lower pedestal component 11 and the concave mirror 25, degradation of the optical performance due to the difference in thermal expansion between the lower pedestal component 11 and the concave mirror 25 can be prevented or alleviated.

Other configuration and operation in the third embodiment are similar to those in the first embodiment, and so the same symbols are assigned to the same elements, and redundant explanations are omitted. This embodiment can also be combined with the second embodiment.

Fourth Embodiment

Figure 19:
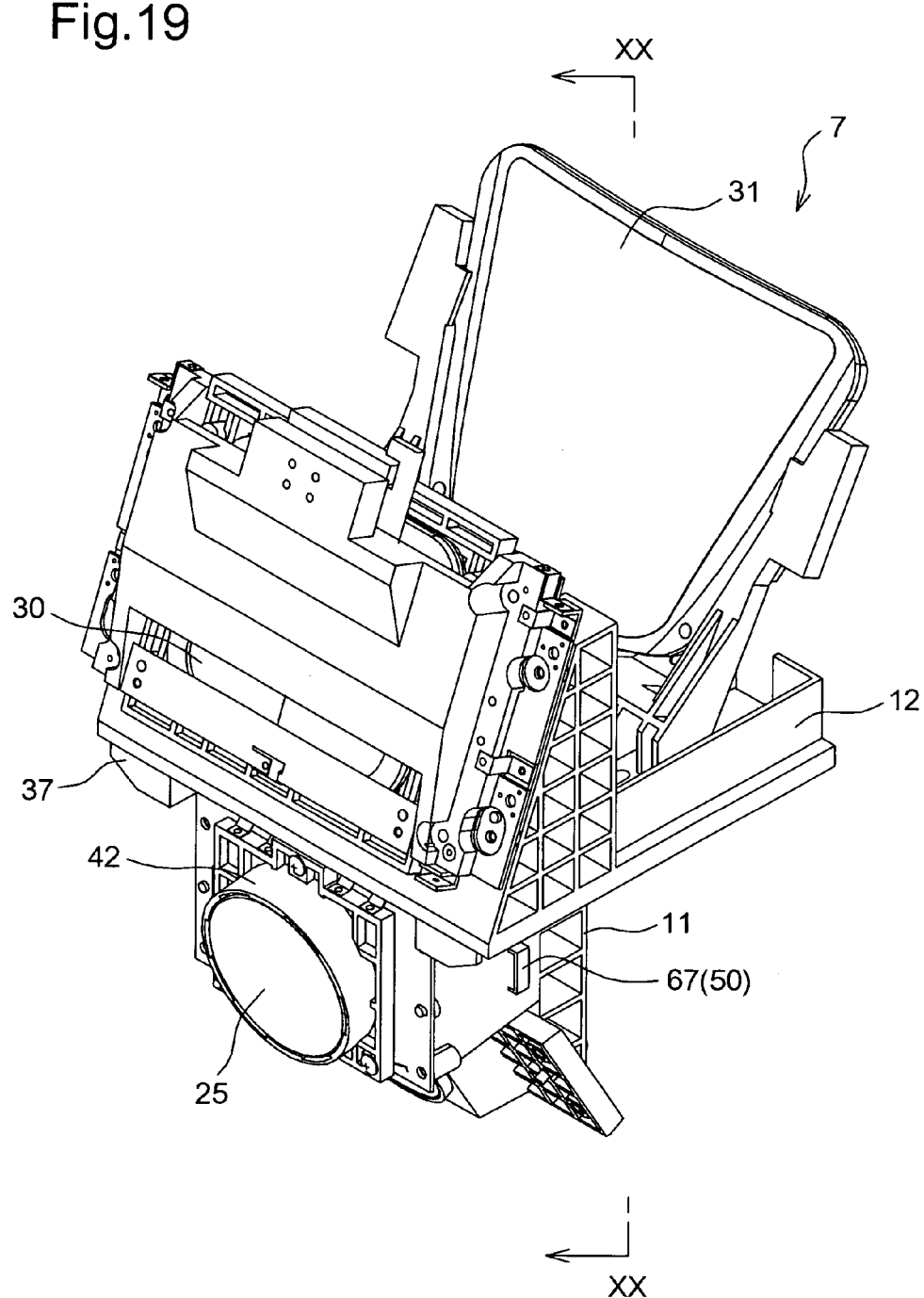
FIG. 19 is an external perspective view of a projection optical system unit according to a fourth embodiment of the present invention.
Figure 20:
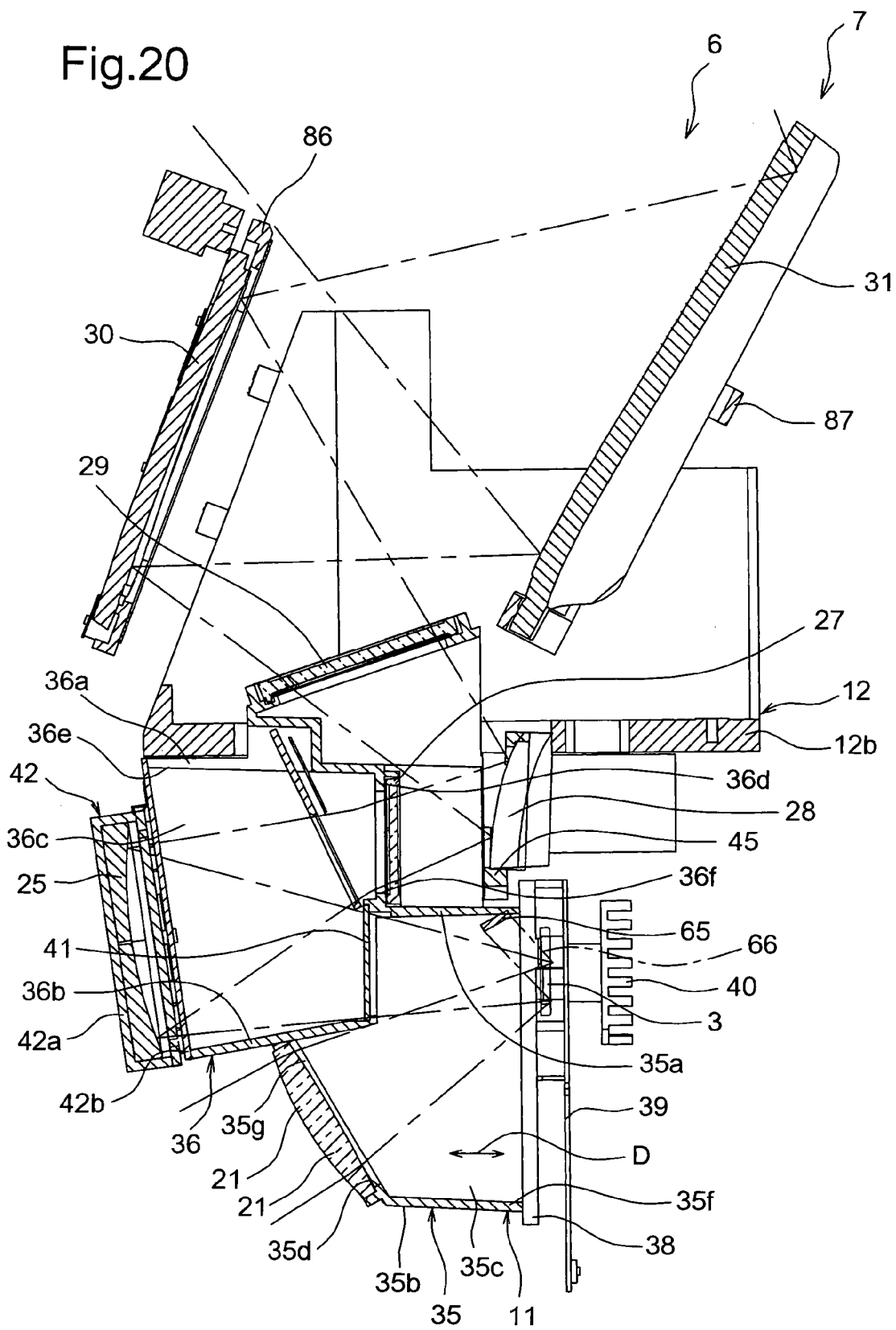
FIG. 20 is a cross sectional view along a line XX-XX in FIG. 19.

The fourth embodiment of this invention shown in FIGS. 19 and 20 also differs from the first embodiment with respect to configurations of the heating device 50. The heating device 50 in this embodiment uses an extraneous light absorption plate (light absorption member) 65 as the heat source. As shown in FIG. 20, the extraneous light absorption plate 65 is a metal plate painted in black, and fixed to the top wall 35a within the first tubular portion 35. Extraneous lights 66 reflected by the mirror elements of the DMD 3 which are in the "off" status are directed upward in FIG. 20 so as not to be incident on the projection optical system 6, and is absorbed by the extraneous light absorption plate 65. The extraneous light absorption plate 65 is heated by absorption of the extraneous light 66. The heating device 50 also comprises a heat transfer plate (heat transfer member) 67 to transfer the heat generated by the extraneous light absorption plate 65 to the lower pedestal component 11. In this embodiment, the heat transfer plate 67 is a long, narrow strip-shaped metal plate, one end of which is joined to the extraneous light absorption plate 65 within the first tubular portion 35, The heat transfer plate extends from the interior of the first tubular portion 35 to the outside of the lower pedestal component 11, and the other end is joined to a side wall 35c of the first tubular portion 35.

Heat generated by the extraneous light absorption plate 65 is transferred to the lower pedestal component 11 by the heat transfer plate 67, resulting in that the lower pedestal component 11 is heated. As a result, the temperature difference between the lower pedestal component 11 and the concave mirror 25 is reduced, so that degradation of the optical performance due to the difference in the thermal expansion between the lower pedestal component 11 and the concave mirror 25 can be prevented or alleviated. Further, because the extraneous light absorption plate 65 is used as the heat source, there is no need to provide a power supply for heat generation.

Other configuration and operation in the fourth embodiment are similar to those in the first embodiment, and so the same symbols are assigned to the same elements, and redundant explanations are omitted. This embodiment can also be combined with the second embodiment.

Fifth Embodiment

Figure 21:
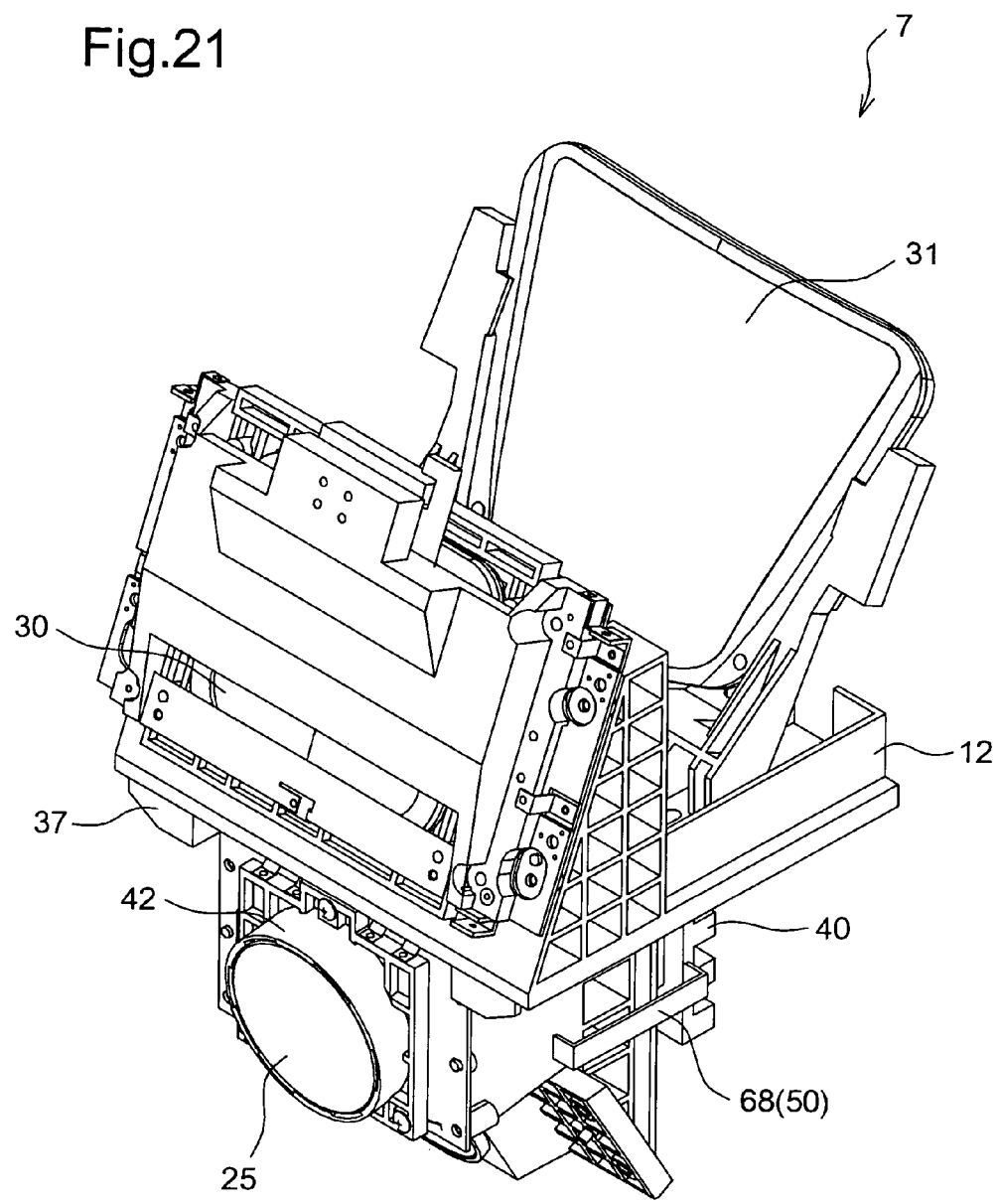
FIG. 21 is an external perspective view of a projection optical system unit according to a fifth embodiment of the present invention.

The fifth embodiment of this invention shown in FIG. 21 also differs from the first embodiment with respect to configurations of the heating device 50. The heating device of this embodiment uses the heat sink 40 for the DMD 3 as the heat source, and also comprises a heat transfer plate 68 positioned on the outside of the lower pedestal component 11. One end of the heat transfer plate 68 is connected to the heat sink 40, and the other end is connected to the side wall 35c of the first tubular portion 35 of the lower pedestal component 11. Heat generated by the DMD 3 and collected in the heat sink 40 is transferred to the lower pedestal component 11 by the heat transfer plate 68, resulting in that the lower pedestal component 11 is heated. As a result, the temperature difference between the lower pedestal component 11 and the concave mirror 25 is reduced, so that degradation of the optical performance arising from differences in thermal expansion between the lower pedestal component 11 and the concave mirror 25 can be prevented or alleviated. Further, because the heat sink 40 for the DMD 3 is used as the heat source, there is no need to provide a power supply for heat generation.

Other configuration and operation in the fifth embodiment are similar to those in the first embodiment, and so the same symbols are assigned to the same elements, and redundant explanations are omitted. This embodiment can also be combined with the second embodiment.

Sixth Embodiment

Figure 22:
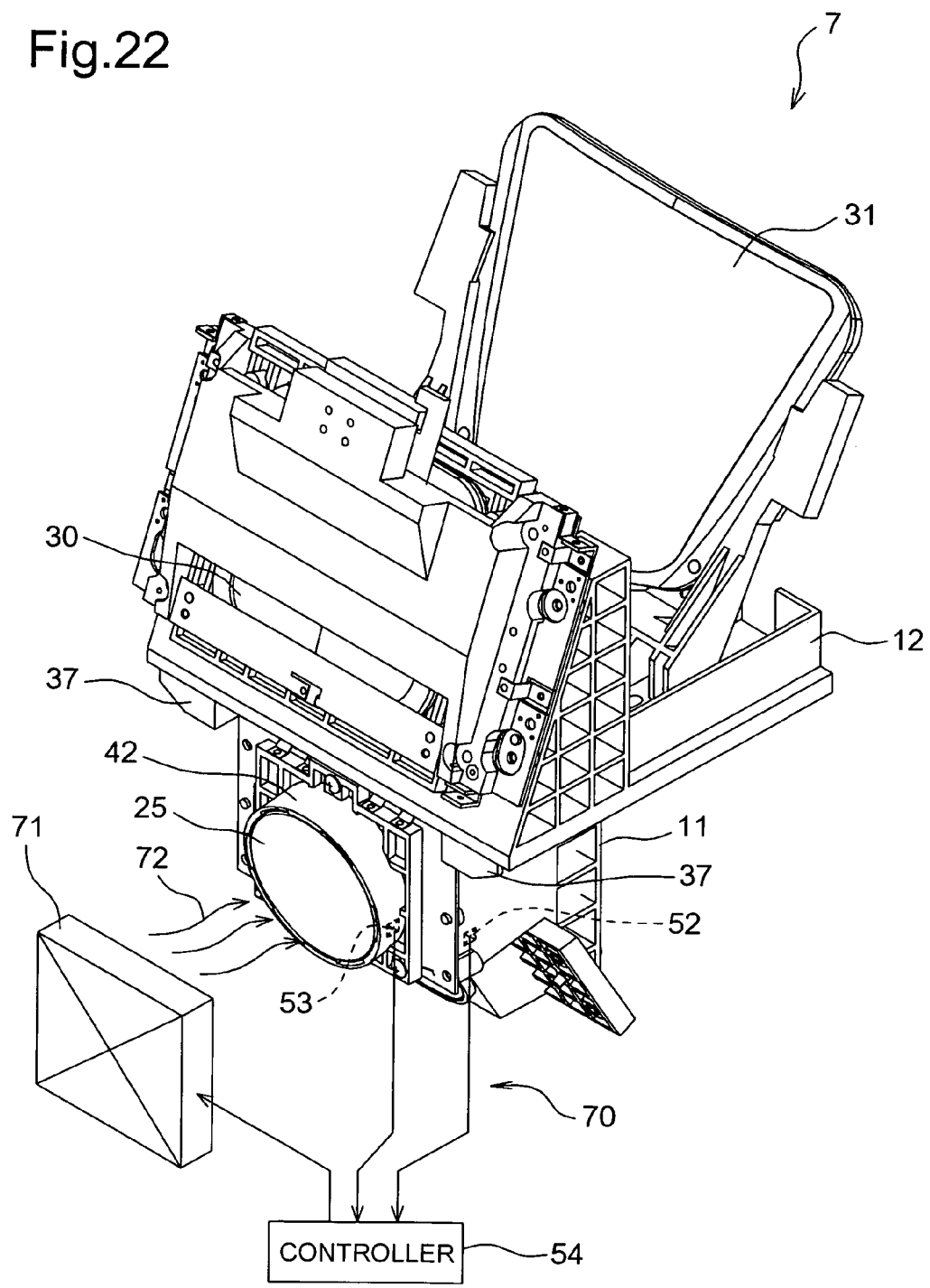
FIG. 22 is an external perspective view of a projection optical system unit according to a sixth embodiment of the present invention.

The sixth embodiment of this invention shown in FIG. 22 comprises, in place of the heating devices 50 of the first through fifth embodiments, a cooling device 70. As explained above, the heating devices 50 of the first through fifth embodiments reduces the temperature difference between the concave mirror 25 and the lower pedestal component 11 by heating the lower pedestal component 11. On the other hand, the cooling device 70 of this embodiment reduces the temperature difference between the concave mirror 25 and the lower pedestal component 11 by cooling the concave mirror 25 and the mirror holding component 42.

The cooling device 70 comprises a blower fan 71 positioned so as to be faced with the concave mirror 25 and mirror holding component 42, a temperature sensor 52 placed within a side wall 35c, a temperature sensor 53 placed within the mirror holding component 42, and a controller 54. Cooling air 72 blown from the blower fan 71 cools the concave mirror 25 and mirror holding component 42.

The controller 54 controls operation of the blower fan 71 so as to reduce the temperature difference between the concave mirror 25 and mirror holding component 42, based on the temperature of the lower pedestal component 11 detected by the temperature sensor 52 and the temperature of the concave mirror 25 detected by the temperature sensor 53. Specifically, when the temperature of the concave mirror 25 is judged to be higher than the temperature of the lower pedestal component 11 exceeding a predetermined range, based on the temperatures detected by the temperature sensors 52 and 53, the controller 54 causes the blower fan 71 to operate, so that cooling air 72 cools the concave mirror 25 and mirror holding component 42. On the other hand, when the temperature of the concave mirror 25 is judged to be lower than the temperature of the lower pedestal component 11 based on the temperatures detected by the temperature sensors 52 and 53, the controller 54 stops the blower fan 71, halting the blowing of cooling air 72.

By using the blower fan 71 to cool the concave mirror 25 and the mirror holding component 42, the temperature difference between the lower pedestal component 11 and the concave mirror 25 is reduced, so that degradation of the optical performance arising from the difference in thermal expansion between the lower pedestal portion 11 and the mirror holding component 42 can be prevented or alleviated. Also, because blowing by the blower fan 71 is controlled based on the temperatures detected by the temperature sensors 52 and 53, a status can be reliably maintained in which the temperature difference between the lower pedestal component 11 and the concave mirror 25 is reduced.

The controller 54 may also control a number of revolutions of the blower fan 71 so as to regulate a flow rate of cooling air 72 according to the temperature difference between the concave mirror 25 and the lower pedestal component 11, based on the temperatures detected by the temperature sensors 52 and 53. Specifically, when the mirror holding component 42 is at a higher temperature than the concave mirror 25, the controller 54 raises the revolution rate of the blower fan 71 according to the increase in the temperature difference between the mirror holding component 42 and the lower pedestal component 11 to increase the flow of cooling air 72. By this operation, the greater the difference in temperature between the mirror holding component 42 and the lower pedestal component 11 is, the greater the cooling effect of the cooling device 70 is. Thus, the temperature difference between the concave mirror 25 and the lower pedestal component 11 can be reduced more effectively.

By using the blower fan 71 to cool the concave mirror 25 and mirror holding component 42, the projection optical system 6 can be used at the normal temperature or at a temperature close to the normal temperature. Therefore, the lower pedestal component 11, upper pedestal portion 12, mirror holding component 42, mirror holding component 45, curved mirrors 25, 28, 30, 31, and other components constituting the projection optical system unit 7 are optically designed so as to offer desired optical performances when they are used in a state of minimal thermal expansion under the normal temperature.

Any one of the temperature sensors 52 and 53 may be provided, with the controller 54 controlling the blower fan 71 based only on the temperature detected thereby. Further, because the temperature of the mirror holding component 42 is closely correlated with the temperature of the concave mirror 25, the temperature of the mirror holding component 42 may be measured using a temperature sensor. Temperature sensors may also be provided on mirrors or mirror holding holders other than the mirror holding component 42, and the detected temperatures may be used by the controller 54. Also, cooling devices other than the blower fan 71 such as a Peltier element may be used.

Other configuration and operation in the sixth embodiment are similar to those in the first embodiment, and so the same symbols are assigned to the same elements, and redundant explanations are omitted. This embodiment can also be combined with the second embodiment.

The present invention is not limited to the above embodiments, and various modifications are possible. For example, the image formation device may be reflection type image formation devices other than the DMD such as a reflection type liquid crystal display device, or a transmission type image formation devices such as a transmission type liquid crystal display device. Further, although the present invention was explained taking as an example a rear projection television, which is a rear projection type image display apparatus, but this invention can also be applied to a front projection type image display apparatus such as a video projector which projects images onto a screen from a front side. Further, the optical configurations of the projection optical system are not limited to those of the embodiments. For example, the number of curved mirrors, the placement of spherical mirrors, aspherical mirrors and free-form curved mirrors, and the surface shapes of curved mirrors, may be different.

Although the present invention has been fully described in conjunction with preferred embodiments thereof with reference to the accompanying drawings, various changes and modifications are possible for those skilled in the art. Therefore, such changes and modifications should be construed as included in the present invention unless they depart from the intention and scope of the invention as defined by the appended claims.

What is claimed is:

1. A projection optical system unit, comprising:
   a plurality of curved mirrors for reflecting image light modulated by an image formation device onto a screen;
   an image formation device holder for holding the image formation device;
   a plurality of mirror holders each of which holds one of the curved mirrors;
   a pedestal to which the image formation device holder and at least one of the mirror holders are fixed, a linear heat expansion coefficient of which in a specific direction is between $0.8 \times 10^{-5}$ (1/K) and $3.0 \times 10^{-5}$ (1/K), the specific direction being a direction intermediate between directions of a incident light beam and emitted light beam of one of the curved mirrors.

2. The projection optical system unit according to claim 1, wherein the pedestal comprises a first pedestal portion having a tubular portion in which first and second openings are formed at either end,
   wherein the image formation device holder is fixed to the first pedestal at a side of the first opening, and
   wherein the mirror holders include a first mirror holder holding a first curved mirror positioned closest to the image formation device in a light path from the image formation device to the screen among the plurality of curved mirrors, the first mirror holder being fixed to the first pedestal portion at a side of the second opening.

3. The projection optical system unit according to claim 2, wherein the tubular portion of the first pedestal portion comprises a first edge formed on a periphery of the first opening and being in close contact with the image formation device holder.

4. The projection optical system unit according to claim 3, wherein the tubular portion of the first pedestal portion has a second edge formed on a periphery of the second opening and being in close contact with the first mirror holder.

5. The projection optical system unit according to claim 2, wherein the tubular portion of the first pedestal portion comprises:
   a first tubular portion, at one end of which the first opening is formed, and at the other end of which a third opening is formed; and
   a second tubular portion, one end of which is opened to the first tubular portion through the third opening portion, and at the other end of which the second opening is formed, and wherein the first pedestal portion further comprises a fixation portion to which a second mirror holder is fixed, the second mirror holder holding a second curved mirror positioned closest to the first curved mirror in the light path among the plurality of curved mirrors.

6. The projection optical system unit according to claim 5, wherein the pedestal comprises a second pedestal portion to which third and fourth mirror holders are fixed, the third and fourth mirrors respectively holding third and fourth curved mirrors of the plurality of curved mirrors, the second pedestal portion being connected to the first pedestal portion.

7. The projection optical system unit according to claim 1, wherein the linear thermal expansion coefficient in the specific direction of the pedestal is between $0.8 \times 10^{-5}$ (1/K) and $2.2 \times 10^{-5}$ (1/K).

8. The projection optical system unit according to claim 1, further comprising:
a first mirror holder fixed to the pedestal and holding a first curved mirror among the plurality of curved mirrors; and
a second mirror holder fixed to the pedestal and holding a second curved mirror opposite to the first curved mirror,
wherein the first mirror folder is fixed to the pedestal at a position on the side opposite to the second curved mirror, and
wherein a linear thermal expansion coefficient in the specific direction of the first mirror holder is larger than the linear thermal expansion coefficient in the specific direction of the pedestal.

9. The projection optical system unit according to claim 1, wherein the mirror holders are made of material having anisotropy in the linear thermal expansion coefficient, and
wherein the linear thermal expansion coefficient in the specific direction of the mirror holder is smaller than that in a direction perpendicular to the specific direction.

10. The projection optical system unit according to claim 1, further comprising a temperature regulator to decrease a temperature difference between the curved mirrors and pedestal.

11. The projection optical system unit according to claim 10, wherein the temperature regulator comprises a heating device for heating the pedestal.

12. The projection optical system unit according to claim 11, wherein the heating device comprises an electrical heating wire mounted on the pedestal.

13. The projection optical system unit according to claim 11, wherein the heating device comprises a heating light source for irradiating the pedestal with light.

14. The projection optical system unit according to claim 11, wherein the image formation device is a reflection-type image formation device, and
wherein the heating device comprises a light absorption member which absorbs the light reflected by the image formation device other than the image light and a heat transfer member which connects the light absorption member and the pedestal.

15. The projection optical system unit according to claim 11, wherein the heating means comprises a heat dissipation member connected to the image formation device, and a heat transfer member which connects the heat dissipation member and the pedestal.

16. The projection optical system unit according to claim 11, wherein the temperature regulator comprises:

a temperature detector which detects the temperature of at least one among the pedestal portion, curved mirrors, and mirror holders; and
a controller which controls the heating device based on temperatures detected by the temperature detector.

17. The projection optical system unit according to claim 11, wherein the temperature regulator comprises cooling device for cooling at least one of the curved mirrors.

18. The projection optical system unit according to claim 17, wherein the cooling device comprises a blower fan which blows cooling air to the curved mirror and the mirror holder.

19. The projection optical system unit according to claim 17, wherein the temperature regulator comprises:
a temperature detector which detects the temperature of at least one among the pedestal portion, curved mirrors, and mirror holders; and
a controller which controls the cooling device based on temperatures detected by the temperature detector.

20. A projection-type image display apparatus, comprising:
an image formation device;
an illumination optical system unit having an illumination optical system which illuminates the image formation device with illuminating light;
the projection optical system unit according to claim 1; and
a screen onto which image light modulated by the image formation device is projected by the projection optical system unit.

21. A projection optical system unit, comprising a projection optical system in which image light modulated by an image formation device is reflected by a plurality of curved mirrors to be projected onto a screen,
wherein the projection optical system comprises a first curved mirror which is a concave mirror, a second curved mirror which is a convex mirror, a third curved mirror, and a fourth curved mirror arranged in this order in a light path from the image formation device to the screen,
wherein among a plurality of mirror holders each of which holds one of the first to fourth curved mirrors, at least a first mirror holder holding the first curved mirror and a second mirror holder holding the second curved mirror are fixed to a common pedestal; and
wherein a linear thermal expansion coefficient of the pedestal in a specific direction is between $0.8 \times 10^{-5}$ (1/K) and $3.0 \times 10^{-5}$ (1/K), the specific direction being a direction intermediate between directions of an incident light beam and emitted light beam of one of the curved mirrors.

22. The projection optical system unit according to claim 21, wherein the pedestal comprises a first pedestal portion having a tubular portion in which first and second openings are formed at either end,
wherein an image formation device holder holding the image formation device is fixed to the first pedestal portion at a side of the first opening, and
wherein the first mirror holder is fixed to the first pedestal portion at a side of the second opening.

23. The projection optical system unit according to claim 22, wherein the tubular portion of the first pedestal portion comprises a first edge formed on a periphery of the first opening and being in close contact with the image formation device holder.

24. The projection optical system unit according to claim 23, wherein the tubular portion of the first pedestal portion has a second edge formed on a periphery of the second opening and being in close contact with the first mirror holder.

25. The projection optical system unit according to claim 23, wherein the first pedestal portion further comprises a fixation portion to which a second mirror holder holding the second curved mirror is fixed.

26. The projection optical system unit according to claim 23, wherein the first pedestal portion further comprises, on the same side as the first edge, a fixation portion to which a second mirror holder holding the second curved mirror is fixed.

27. The projection optical system unit according to claim 25, wherein the pedestal comprises a second pedestal portion to which third and fourth mirror holders respectively holding the third and fourth curved mirrors are fixed, the second pedestal portion being connected to the first pedestal portion.

28. The projection optical system unit according to claim 21, further comprising a temperature regulator to decrease a temperature difference between the curved mirrors and pedestal.

* * * * *